United States Patent
Bradbury et al.

(10) Patent No.: US 9,323,529 B2
(45) Date of Patent: *Apr. 26, 2016

(54) REDUCING REGISTER READ PORTS FOR REGISTER PAIRS

(75) Inventors: Jonathan D. Bradbury, Poughkeepsie, NY (US); Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 874 days.

This patent is subject to a terminal disclaimer.

(21) Appl. No.: 13/552,099

(22) Filed: Jul. 18, 2012

(65) Prior Publication Data

US 2014/0025927 A1     Jan. 23, 2014

(51) Int. Cl.
*G06F 9/30* (2006.01)
*G06F 15/76* (2006.01)

(52) U.S. Cl.
CPC .......... *G06F 9/30141* (2013.01); *G06F 9/3005* (2013.01); *G06F 9/30014* (2013.01); *G06F 9/30098* (2013.01); *G06F 9/30185* (2013.01)

(58) Field of Classification Search
CPC ..................... G06F 9/30112; G06F 9/30014
See application file for complete search history.

(56) References Cited

U.S. PATENT DOCUMENTS

| | | | |
|---|---|---|---|
| 5,428,754 A | 6/1995 | Baldwin | |
| 5,864,704 A | 1/1999 | Battle et al. | |
| 6,295,599 B1 | 9/2001 | Hansen et al. | |
| 6,463,525 B1* | 10/2002 | Prabhu | 712/222 |
| 6,658,578 B1 | 12/2003 | Laurenti et al. | |
| 8,417,922 B2 | 4/2013 | Codrescu | |
| 2002/0032848 A1* | 3/2002 | Liao et al. | 712/4 |
| 2003/0115440 A1 | 6/2003 | Garg et al. | |
| 2004/0057321 A1 | 3/2004 | Esch | |
| 2008/0104375 A1 | 5/2008 | Hansen et al. | |
| 2009/0158012 A1 | 6/2009 | Hansen et al. | |
| 2009/0198977 A1* | 8/2009 | Gschwind et al. | 712/226 |
| 2011/0047533 A1* | 2/2011 | Gschwind | 717/140 |
| 2013/0073836 A1* | 3/2013 | Gschwind et al. | 712/222 |
| 2013/0073838 A1* | 3/2013 | Gschwind et al. | 712/226 |
| 2014/0025927 A1 | 1/2014 | Bradbury et al. | |
| 2015/0121045 A1* | 4/2015 | Bradbury et al. | 712/225 |
| 2015/0121047 A1* | 4/2015 | Bradbury et al. | 712/226 |

OTHER PUBLICATIONS

IBM, "Method for reduced power by decreasing the number of write ports in register files", IP.com publication May 10, 2002, pp. 1-4.

(Continued)

*Primary Examiner* — Hyun Nam
(74) *Attorney, Agent, or Firm* — Cantor Colburn LLP; Margaret McNamara

(57) ABSTRACT

Embodiments relate to reducing a number of read ports for register pairs. An aspect includes executing an instruction. The instruction identifies a pair of registers as containing a wide operand which spans the pair of registers. It is determined if a pairing indicator associated with the pair of registers has a first value or a second value. The first value indicates that the wide operand is stored in a wide register, and the second value indicates that the wide operand is not stored in the wide register. Based on the pairing indicator having the first value, the wide operand is read from the wide register. Based on the pairing indicator having the second value, the wide operand is read from the pair of registers. An operation is performed using the wide operand.

8 Claims, 21 Drawing Sheets

(56) References Cited

OTHER PUBLICATIONS

IBM, "Method to reduce the area and increase the speed of a highly ported register file", IP.com published Nov. 13, 2002, pp. 1-8.
IBM, z/Architecture—Principles of Operation, Publication No. SA22-7832-08, 9th Edition, Aug. 2010, pp. 1-1496.
U.S. Appl. No. 13/421,599, entitled "Instruction to Load Data Up to a Dynamically Determined Memory Boundary", filed Mar. 15, 2012.
U.S. Appl. No. 13/552,109; Non-Final Office Action; Date Filed: Jul. 18, 2012; Date Mailed: Apr. 22, 2015; 12 pages.
U.S. Appl. No. 13/552,108; Non-Final Office Action; Date Filed: Jul. 18, 2012; Date Mailed: May 22, 2015; 15 pages.
U.S. Appl. No. 14/520,580; Non Final Office Action; Date Filed: Oct. 22, 2014; Date Mailed: May 21, 2015; 18 pages.

* cited by examiner

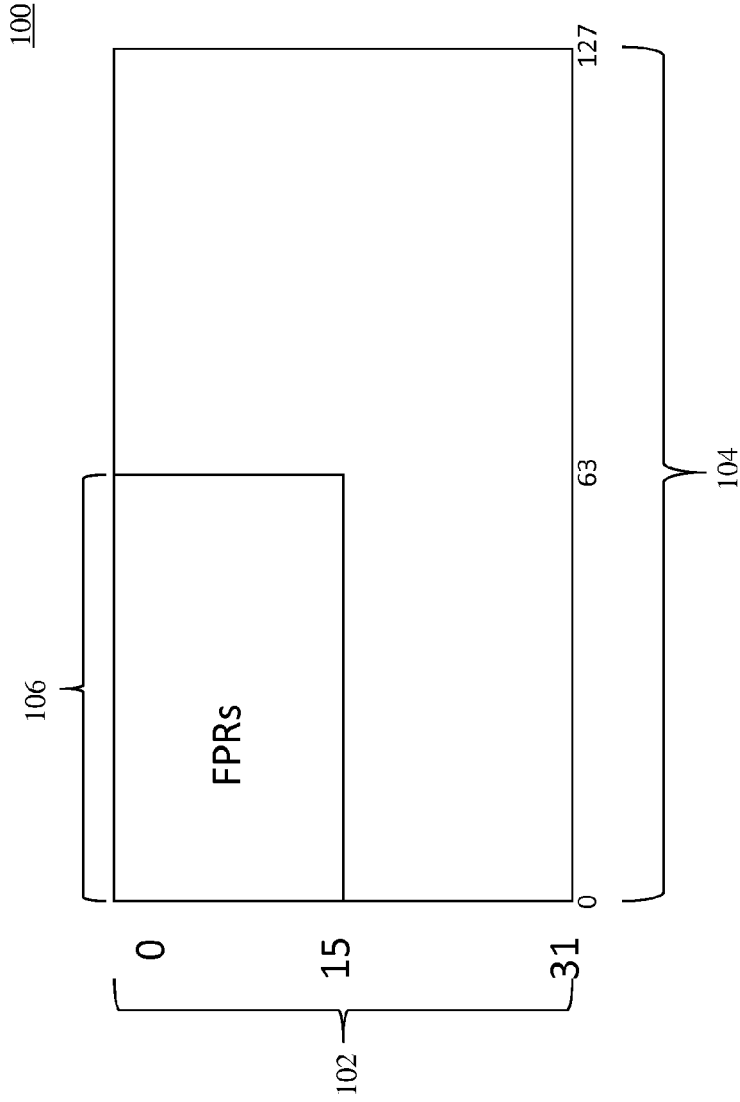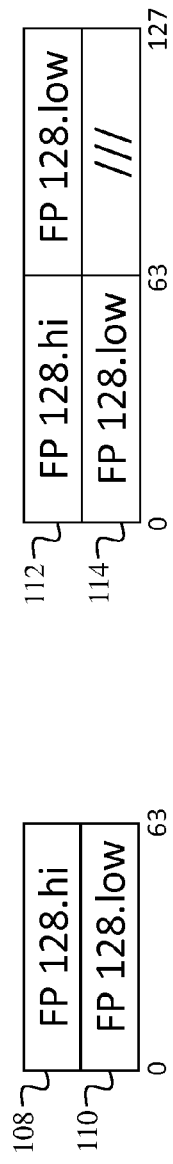

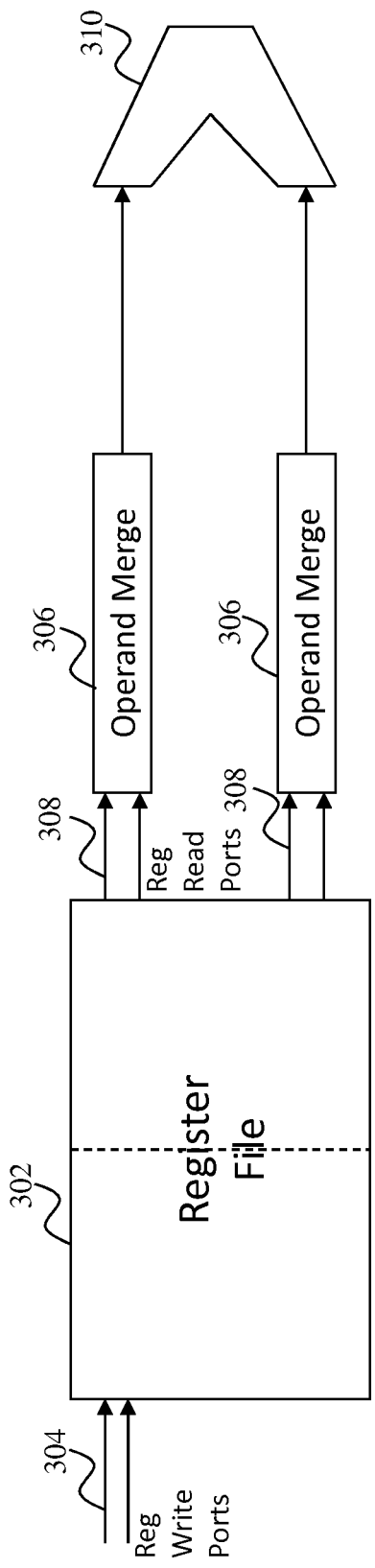
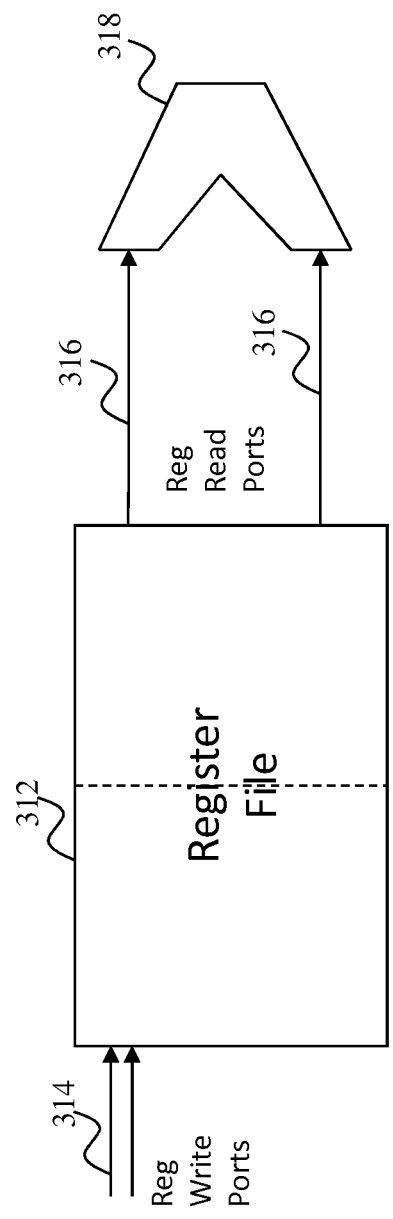
FIG. 3A
FIG. 3B

FIG. 6A

| 602 | 0 | 1 | 2 | 3 | 4 | 5 | 6 | 7 |
|---|---|---|---|---|---|---|---|---|
| Y |   |   |   |   |   |   |   |   |
| N | x | x | x | x | x | x | x | x |

FIG. 6B

| 604 | 0 | 1 | 2 | 3 | 4 | 5 | 6 | 7 |
|---|---|---|---|---|---|---|---|---|
| Y | x |   |   |   |   |   |   |   |
| N |   | x | x | x | x | x | x | x |

FIG. 6C

| 606 | 0 | 1 | 2 | 3 | 4 | 5 | 6 | 7 |
|---|---|---|---|---|---|---|---|---|
| Y | x |   |   | x |   |   |   |   |
| N |   | x | x |   | x | x | x | x |

|   | 0 | 1 | 2 | 3 | 4 | 5 | 6 | 7 |
|---|---|---|---|---|---|---|---|---|
| Y |   |   |   | x |   |   |   |   |
| N | x | x | x |   | x | x | x | x |

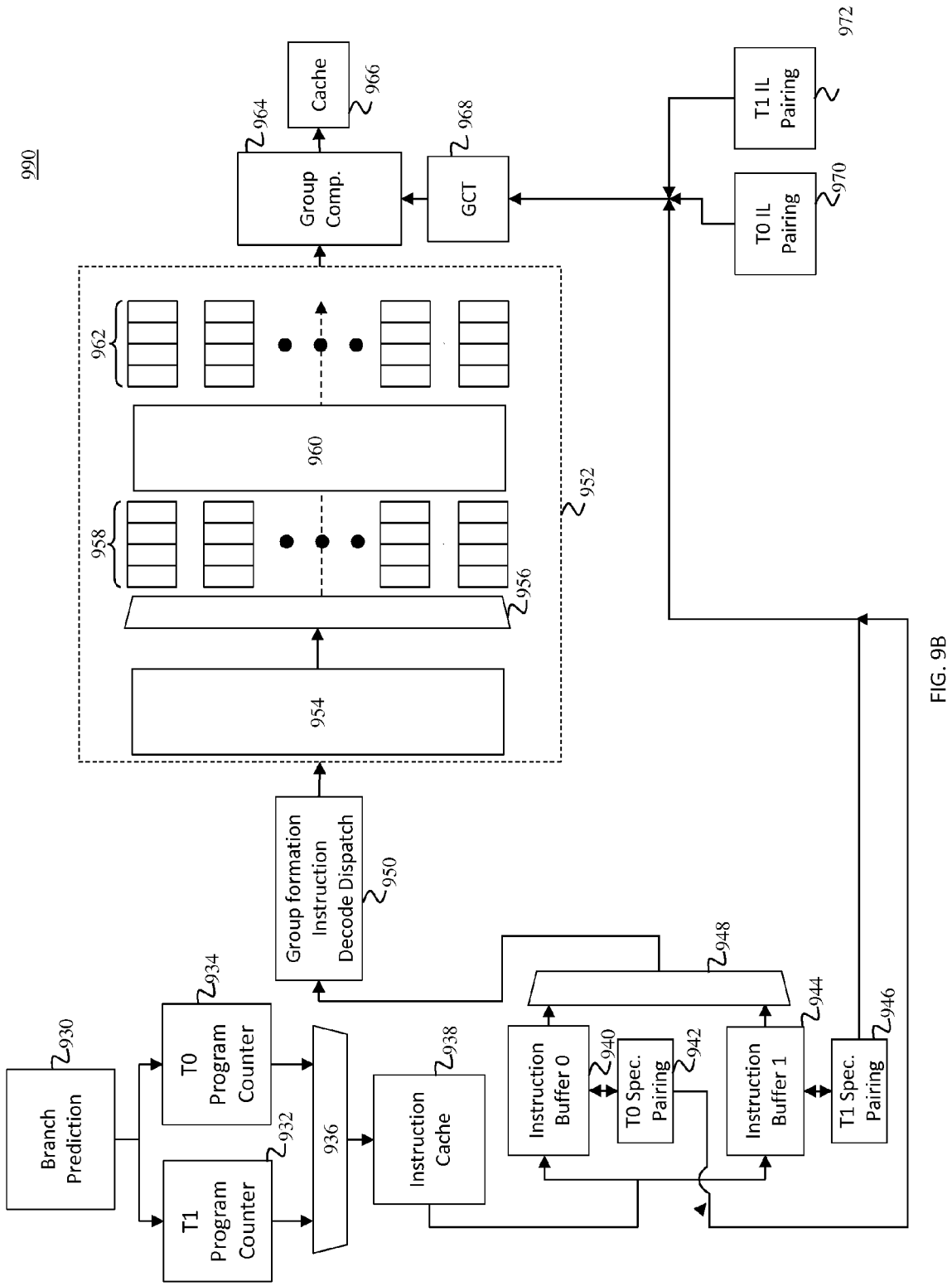

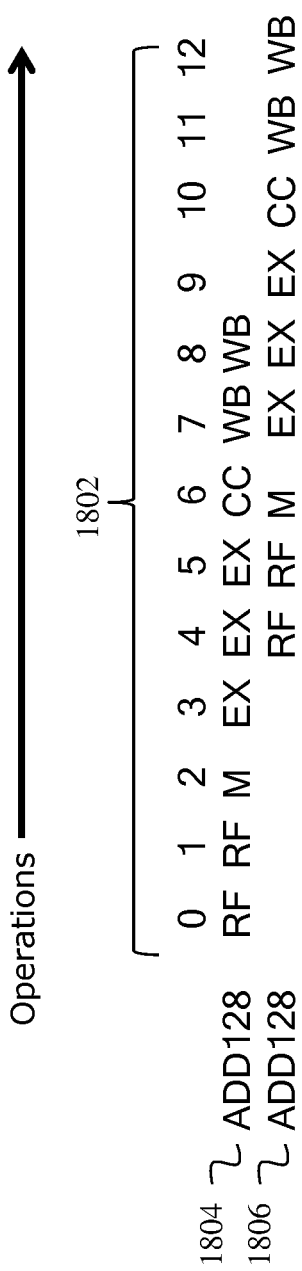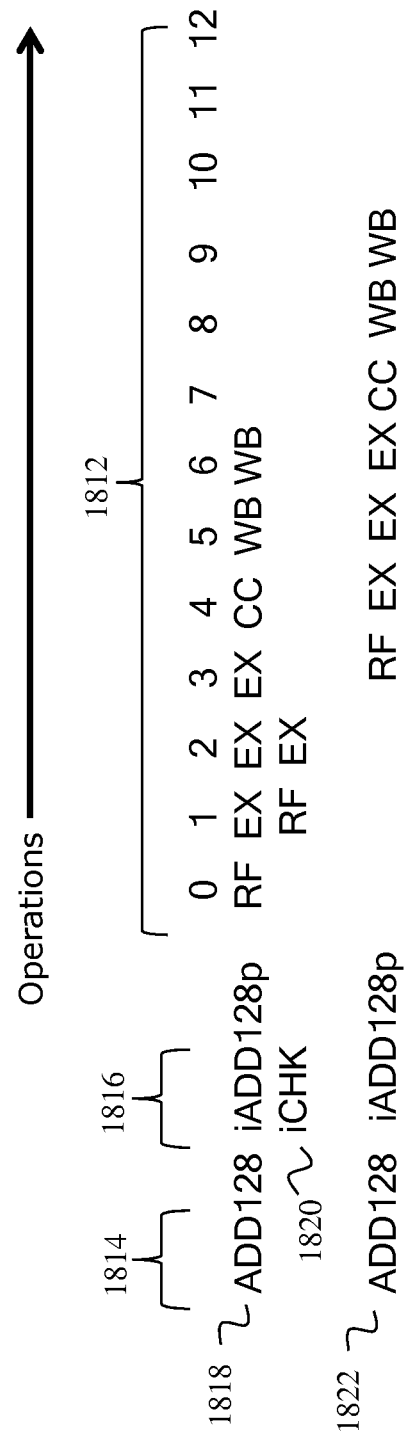
FIG. 18A
FIG. 18B

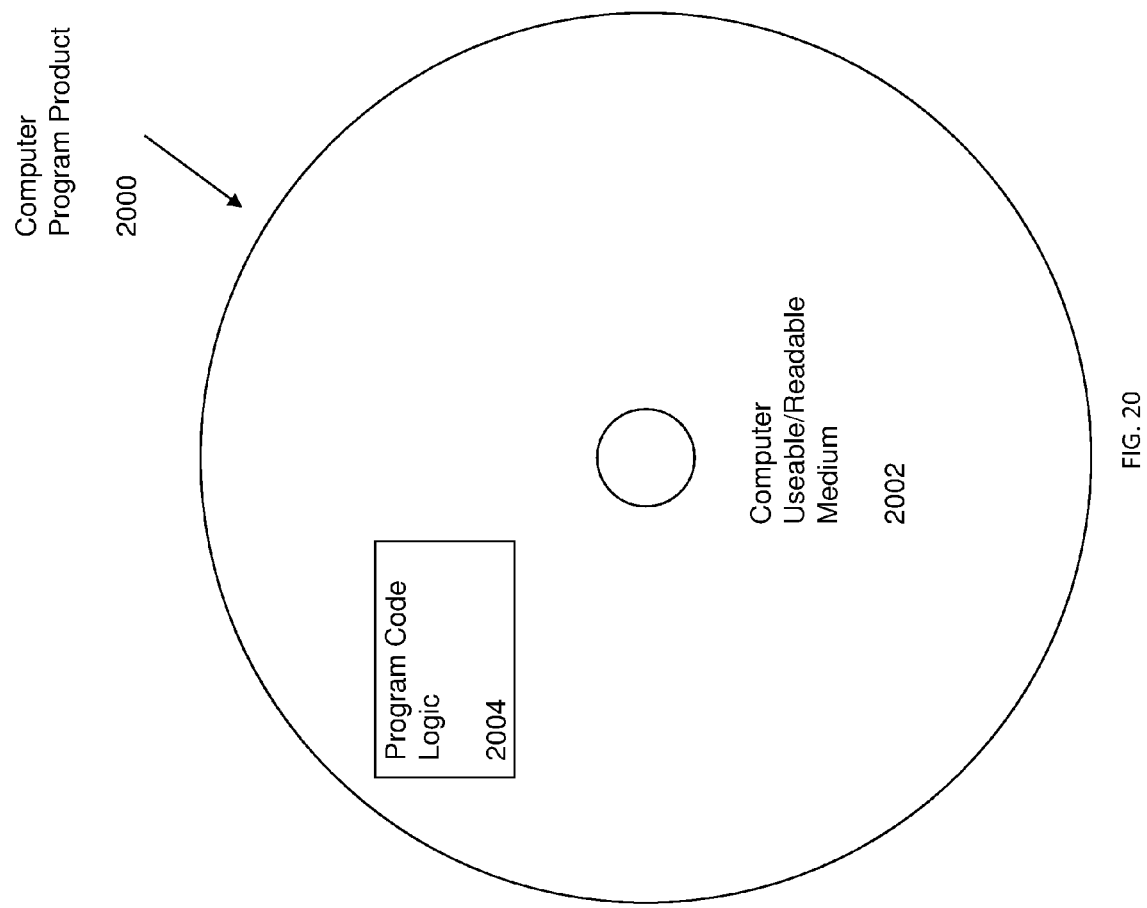

REDUCING REGISTER READ PORTS FOR REGISTER PAIRS

BACKGROUND

This present invention relates generally to processing within a computing environment, and more particularly to reducing register file ports for register pairs.

Computer architecture data precision is often limited by the hardware. For example, hardware with 64-bit registers will typically be limited to using 64-bit data. In order to extend the precision of the data beyond 64-bits, special processing is required.

One method of extending the precision of data is to use register pairing. Register pairing splits a floating point number, for example, across a pair of hardware registers. By using register pairing the precision of a floating point number can be double what is possible using a single register.

When using register pairing a single operation, such as an add operation, may require the reading of 4 registers and the writing of 2. This requires double the number of read ports to a register file to order to obtain the operands in one access to the registers, or multiple accesses using a single port, which increases operation latency. On a subsequent read of this value the two halves of the operand have to be read out and pieced back together, which further increasing complexity and latency.

SUMMARY

An embodiment includes a system for reducing a number of read ports for register pairs. The system includes a set of registers and a set of wide registers. The set of registers and the set of wide registers are addressable by register fields of instructions. The system additionally includes a processing circuit coupled to the set of registers and the set of wide registers and is configured to perform a method that includes executing an instruction. The instruction identifies a pair of registers as containing a wide operand which spans the pair of registers. It is determined if a pairing indicator associated with the pair of registers has a first value or a second value. The first value indicates that the wide operand is stored in a wide register, and the second value indicates that the wide operand is not stored in the wide register. Based on the pairing indicator having the first value, the wide operand is read from the wide register. Based on the pairing indicator having the second value, the wide operand is read from the pair of registers. An operation is performed using the wide operand.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 1A depicts a register file in an embodiment;

FIG. 1B depicts register pairing in a 64-bit register in an embodiment;

FIG. 1C depicts register pairing in a 128-bit register in an embodiment;

FIG. 3A depicts a schematic diagram for processing an extended precision operation in an embodiment;

FIG. 3B depicts a schematic diagram for processing an extended precision operation in an alternate embodiment;

FIGS. 6A-6C depict a logical register pair tracking mechanism in an embodiment;

FIG. 7 depicts a logical register pair tracking mechanism in an embodiment;

FIG. 9B depicts a multi-threaded processor that performs speculative fetching based on branch predictions in an embodiment;

FIG. 18A depicts sample extended precision operations on a paired register without the use of register paired states in an embodiment;

FIG. 18B depicts sample extended precision operations on a paired register using predictive register pairing in an embodiment;

FIG. 20 depicts a computer program product in an embodiment.

DETAILED DESCRIPTION

Figure 2A:
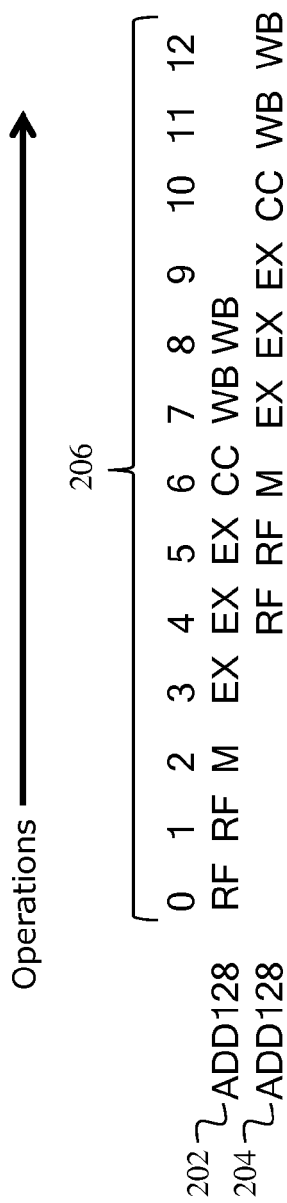
FIG. 2A depicts sample extended precision operations on a paired register in an embodiment.

An embodiment provides for enhanced performance and a reduced number of register ports for accessing register pairs by storing a register pair in a single double width register while maintain the pairing relationship.

When floating point registers are overlaid over larger precision vector registers, it is possible to keep an entire double sized value (i.e., a wide operand) in a single register. Using wide registers eliminates the need to access two registers in a register pair to retrieve an extended operand (e.g., a high precision floating point number) and provides for a single access a wide register. In an embodiment, the full extended precision result of an extended precision instruction is written to a first vector register provided by the instruction across a 128-bit data path. In an embodiment, a second operation (e.g., a permute operation) is used to copy the rightmost half of the result to the paired register to maintain architectural correctness.

The extended precision instructions include one or more operands. In an embodiment, the operands are the same size (or width) as the vector register (e.g., 128-bits). In an additional embodiment, the operands may be less than the full width of the vector register. The operand values travel across a data path over a bus that is at least as wide as the operand. In an embodiment, execution units of a processor retrieve operands and execute the instructions using a dataflow over the bus that is at least as wide as the operands.

FIG. 1A depicts a register file in an embodiment. In an embodiment, the register file 100 is a 128-bit register. In an additional embodiment, the register file 100 is a single instruction multiple data (SIMD) register file. The register file 110 includes 32 registers 102. Each of the 32 registers in the register file 100 includes 128 bits 104. Each of the registers is addressable using one or more register fields in an instruction. The first 16 registers include 16 64-bit long floating point registers 106 that make up the first 64-bits of the entire 128-bit register. The floating point registers 106 provide compatibility for applications that execute 64-bit floating point instructions.

Although FIG. 1A depicts 64-bit floating point registers 106 within 128-bit registers, one of ordinary skill in the art would understand that any sized register file may be used, with more or fewer registers, and wider or narrower registers. In addition, any sized floating point register may be used.

FIG. 1B depicts register pairing in a 64-bit register in an embodiment. In an embodiment, a 128-bit floating point operand is split into a high half 108, and a low half 110, with each half stored in a paired register. In an embodiment, the pair is stored in two operations. In an embodiment, the register pairing is preconfigured. For example, all concurrent registers may be paired together (i.e., register 0 with register 1, register 2 with register 3, etc.). In an additional embodiment, odd and even registers may be paired together (i.e., register 0 with register 2, register 1 with register 3, etc.). Pairing refers to any two associated registers together storing a wide value, without regard to contiguous numbering of the registers of the register pair. For example, the high half 108 could be paired with a low half 110 according to an architectural relationship. For example, in the z/Architecture from IBM, floating point registers are paired such that register 0, is paired with register 2, register 1 is paired with register 3 and so forth. The z/Architecture is described in an IBM Publication entitled "z/Architecture—Principles of Operation," Publication No. SA22-7832-08, 9th Edition, August 2010, which is hereby incorporated herein by reference in its entirety. z/ARCHITECTURE, and IBM are registered trademarks of International Business Machines Corporation, Armonk, N.Y. Other names used herein may be registered trademarks, trademarks or product names of International Business Machines Corporation or other companies. When an operation is performed on floating point numbers that are paired, the operation provides only one half of the register in the operand, because the pairing is preconfigured, the other half of the pairing is known, and therefore does not have to be specified by the instruction. Further descriptions of loading data into registers may be found, for example, in U.S. patent application Ser. No. 13/421,599 titled "Instruction To Load Data Up To A Dynamically Determined Memory Boundary," filed on Mar. 15, 2012, the contents of which are hereby incorporated by reference in its entirety.

FIG. 1C depicts register pairing in a 128-bit register in an embodiment. In an embodiment, the first 128-bit register 112, and the second 128-bit register 114 are registers in the register file 100 of FIG. 1A. A 128-bit floating point operand is stored in its entirety in the first 128-bit register 112. Using a second operation, the low half of the 128-bit floating point operand is loaded into the first 64-bit section of the paired register.

FIG. 2A depicts sample extended precision operations on a paired register in an embodiment. A first instruction 202 is executed. The instructions are executed over a number of operations 206. The first instruction 202 includes two 128-bit operands that are stored in a paired register configuration and executes over a series of operations. In an embodiment, the first instruction 202 executes two register file fetches (RF) to selected the two 128-bit operands from the register pairs (i.e., one half of in each floating point number in each of two registers) followed by a merge operation (M). The merge operation merges the two halves of each of the 128-bit operands into single operands. The instructions operation (e.g., addition) is carried out over three execution operations (EX), a condition code (CC) is set, and then the two halves of the result are written to the two register pairs over two write back operations (WB). The second instruction 204 is executed in the same manner. The result requires 16 operations over 12 cycles.

Figure 2B:
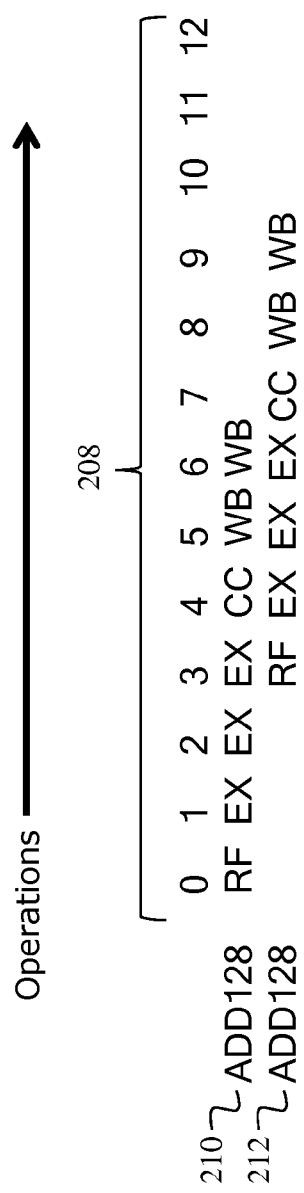
FIG. 2B depicts sample extended precision operations on an enhanced paired register in an embodiment.

FIG. 2B depicts sample extended precision operations on an enhanced paired register in an embodiment. The instructions are executed over a number of operations 208. A first instruction 210 is executed. The first instruction 210 includes two 128-bit operands that are stored in an enhanced paired register configuration and executes over a series of operations. In an embodiment, the first instruction 210 executes one RF to selected the two 128-bit operands from the 128-bit register (i.e., each operand is selected directly from the 128-bit register). Note that no merge operation is needed because the 128-bit operands are fetched whole from the register. The instructions operation (e.g., addition) is carried out over three EX operations a CC is set. The result is a 128-bit operand and is stored in one operation into the first (high) register in its entirety in a WB operation. A second WB operation is used to copy the low order bits to the first 64-bits of the paired register. The second instruction 212 is executed in the same manner. The result requires 12 operations over 9 cycles saving 4 operations, and 3 cycles. In addition, the two operations, which are dependent on one another, are able to execute sooner than would otherwise be the case.

FIG. 3A depicts a schematic diagram for processing an extended precision operation in an embodiment. The register file 302 is updated by a pair of write ports 304. The requested operands are read from the register file 302 over a single operation using four read ports 308, or over two operations using two read ports 308. As stated above, the operands are stored in two 64-bit sections therefore, the operands are merged using two merge operations 306. Once the operands are merged the extended precision operation is performed by an arithmetic logic unit 310 (ALU) and the result is output from the ALU 310.

FIG. 3B depicts a schematic diagram for processing an extended precision operation in an alternate embodiment. The register file 312 is also accessed by a pair of write ports 314. The requested operands are read from the register file 302 over a single operation using only two read ports 316. In this embodiment, the operands have been previously written to the register file 312 as 128-bit operands as described in more detail below, and therefore only a single read to a 128-bit register is needed to retrieve each operand, thereby reducing the number of required read ports to two while still retrieving the two operands in a single cycle. Because the operands are retrieved as 128-bit operands directly from the register file 312, no merge operations or circuitry is required to merge them and the extended precision operation is performed immediately by an ALU 318 on the 128-bit operands, and the result is output from the ALU 318.

It will be understood that the elements of the FIGS. 3A and 3B are provided for clarity and that more or fewer components may be used as would be understood by those of ordinary skill in the art. Furthermore, the operand lengths of 64-bit and 128-bit are used for purposes of clarity and it will be understood by those of ordinary skill in the art that any side operands, larger or smaller, may implement the various embodiments disclosed herein.

Figure 4:
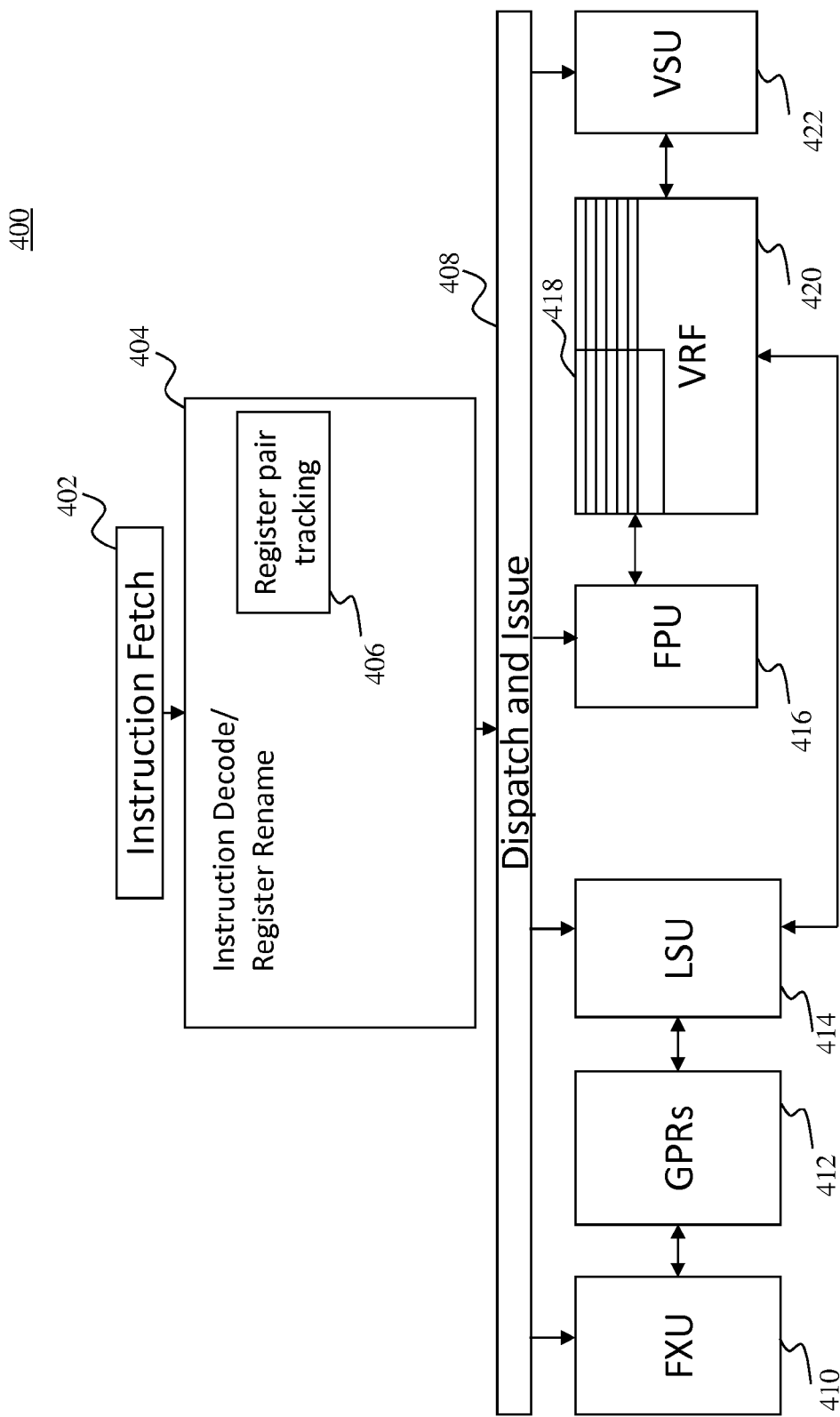
FIG. 4 depicts a schematic diagram of a fetch and dispatch unit of a computer processor in an embodiment.

FIG. 4 depicts a schematic diagram of a fetch and dispatch unit of a computer processor in an embodiment. In an embodiment, the fetch and dispatch unit 400 includes an instruction fetch mechanism 402. The instruction fetch mechanism 402 sends instructions to an instruction decode/register rename module 404. The instruction decode/register rename module 404 decodes instructions and operand and register addresses and places them on the dispatch and issue bus 408. The dispatch and issue bus 408 dispatches requests to the appropriate execution units based on the instruction type. The dispatch and issue bus 408 dispatches requests to one or more a fixed point execution unit 410 (FXU), a load store unit 414 (LSU), a floating point unit 416 (FPU) and a vector scalar unit (VSU). The FXU 410 is used for processing integer operations and accesses a set of general purpose registers 412 (GPRs). The LSU performs reads and writes to the GPRs and the vector register file 420 (VRF). The VRF includes 128-bit vector registers (VRs). In an embodiment, the VRF 420 is the register file 100 of FIG. 1, and includes a 64-bit floating point register 418 within the larger 128-bit VRF 420. The FPU accesses 64-bit floating point numbers from the floating point register 418 within the VRF 420. In an embodiment, the FPU 416 is configured to perform both 64-bit operations and 128-bit extended operations as described above with regard to FIGS. 3A and 3B. The VSU 422 performs 128-bit operations on 128-bit operands stored in the VRF 420, and, in an embodiment, may perform the 128-bit extended operations described above with regard to FIG. 3B.

In an embodiment, register pairing is tracked in a register pair tracking module 406. In an embodiment, the register pair tracking module 406 is a pairing vector and includes a number of bits that is half the number of total pairable registers. For example, in an embodiment that includes 16 registers that may be paired, the register pair tracking module 406 includes 8-bits. The bits of the register pair tracking module 406 are set to indicate if a register has been paired as will be described in more detail below.

Figure 5:
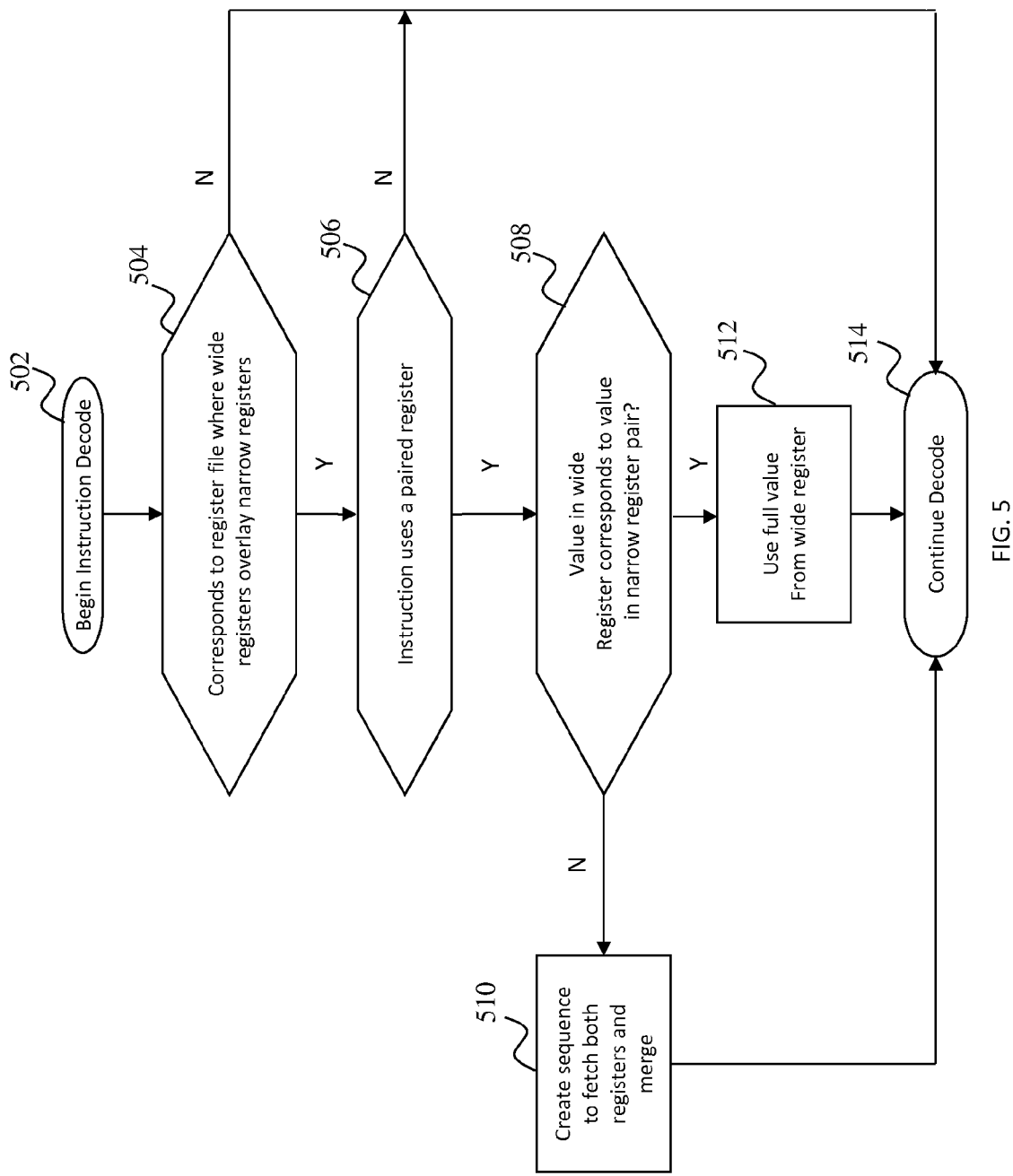
FIG. 5 depicts a process flow for reading operands from one or more paired registers in an embodiment.

FIG. 5 depicts a process flow for reading operands from one or more paired registers in an embodiment. In an embodiment, the process flow of FIG. 5 is executed by the fetch and dispatch unit 400 of FIG. 4. At block 502, the decoding of an instruction is started by, for example, the instruction decode/register rename module 404 of FIG. 4. At block 504, it is determined if the operands of the instruction correspond to a register file where wide registers overlay narrow registers, such as the register file 100 of FIG. 1. If wide registers overlay the narrow registers, then processing continues at block 506, where it is determined if the instruction uses pairing. An instruction uses pairing if, for example, if it performs an extended precision operation using one or more 64-bit paired registers in an FPR. If the instruction uses one or more paired registers, then processing continues at block 508, where it is determined if the value in the wide register corresponds to the value across the two narrow register pairs. In an embodiment, this may be determined by inspecting a value in the register pair tracking module 406 corresponding with the register pair for the one or more operands in the instruction. In an alternate embodiment, this may be determined by comparing the values of the two paired registers with the value of the single wider register (i.e., by comparing the value in the second half of the high register's 128-bit value with the value of the other half of the register pair.) If it is determined that the wide register includes the full value of the paired register, then processing continues at block 512.

At block 512, the entire 128-bit operand is selected from the wide register, as described above with regard to FIG. 3B, and processing continues at block 514 where the decode operation continues. Returning to block 508, if the wide register does not include the values that correspond to the register pairing (i.e., only the second half of the wide register does not include the other half of the register pair) then processing continues at block 510, where a sequence is created to fetched both halves of the register pair and then merge them, as described above with regard to FIG. 3A. Once the sequence is created, processing continues at block 514, where the instruction decode continues. Returning to block 506, if the instruction does not use a paired register then processing continues at block 514, where the instruction decode continues. Returning to block 504, it is determined if the operands of the instruction do not correspond to a register file where wide registers overlay narrow registers, processing continues at block 514, where the instruction decode continues.

FIGS. 6A-6C depict a logical register pair tracking mechanism in an embodiment. In an embodiment, the logical register pair tracking mechanism of FIGS. 6A-6C is the register pair tracking module 406 of FIG. 4. The logical register pair tracking module 602 of FIG. 6A depicts register pair tracking when the logical register pair tracking module 602 is initialized, or reset. In an embodiment, none of the register pairs have been written across a single 128-bit register entry. It will be understood by those of ordinary skill in the art that although the logical register pair tracking module 602 indicates that no register pairs have been written across the 128-bit register entry this does not indicate that the register pairs are not being paired. In an embodiment, one or all of the registers may be paired with 64-bit halves in each of the paired registers without the logical register pair tracking module 602 indicating that the registers are paired.

The logical register pair tracking module 604 of FIG. 6B depicts how the logical register pair tracking module 602 of FIG. 6A will be set after performing the operation R0=R2+R4 where R0 is register a register pair between R0 and R1, R2 is a register pair between R2 and R3, and R4 is a register pair between R4 and R5. In an embodiment, the values stored in the register pair R2 and R3 are read from the registers and merged and added to the merged pairs of the register pair R4 and R5 as described above with regard to FIG. 3A. The results of the addition operation will be stored in the register pair R0 and R1, however, the 64-bit value stored in R1 will also be stored in the second 64-bit section of R0. Because R0 has been written to as a result of an extended precision operation, the first pairing indicator of the logical register pair tracking module 604 is updated to indicate that the R0 register pair (i.e., pair 0) is a valid register pair, and that the 128-bit value in R0 includes the entire extended precision value of the R0 register pair. In an embodiment, the first 64-bit section of register R1 also includes the last 64-bits of the result of the operation, and therefore equals the last 64-bit section of register R0.

The logical register pair tracking module 606 of FIG. 6C depicts how the logical register pair tracking module 604 of FIG. 6B will be set after performing the operation R6=R0+R8 where R0 is register the register pair that was previously set with the result of an extended precision operation, R8 is a register pair between R8 and R9, and R6 is a register pair between R6 and R7. The operation is performed as described above with the output being set to the register pair for R6. The 4$^{th}$ pairing indicator in the logical register pair tracking module 606 (i.e., bit three) is set to indicate that the R6 register pair (i.e., pair 3) is a valid register pair, and that the 128-bit value in R6 includes the entire extended precision value of the R6 register pair. In an embodiment, the first 64-bit section of the register R6 also includes the last 64-bits of the result of the operation, and therefore equals the last 64-bit section of register R7.

Figure 7:
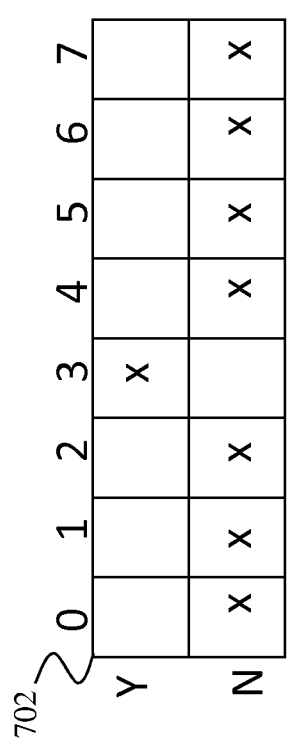

FIG. 7 depicts a logical register pair tracking mechanism in an embodiment. In an embodiment, a logical register pair tracking module 702 of FIG. 7 depicts how the logical register pair tracking module 606 of FIG. 6C will be set after performing the short addition operation (e.g., ADD64) R1=R8+R6. Each of R1, R8 and R6 is used as a standard 64-bit short register. Therefore, after the arithmetic operation is complete the 64-bit result of adding the register R8 and the register R6 will be stored in register R1. Because this 64-bit value is written over the lower half of the R0 register pair, the R0 register pair indicator (i.e., bit three) is reset to indicate that the register pair R0 is no longer a valid register pair. In an embodiment, the register pair indicator in the logical register pair tracking module 702 is reset if the result of the operation were written into the high register (i.e., R0) as well. The logical register pair tracking module 702 therefore only indicates known valid register pairs.

In an embodiment, the logical register pair tracking mechanisms of FIGS. 6A-6C and 7 are implemented as a series of bits that are used to indicate if the logical pairing exists for each of the register pairs supported by the system.

Figure 8:
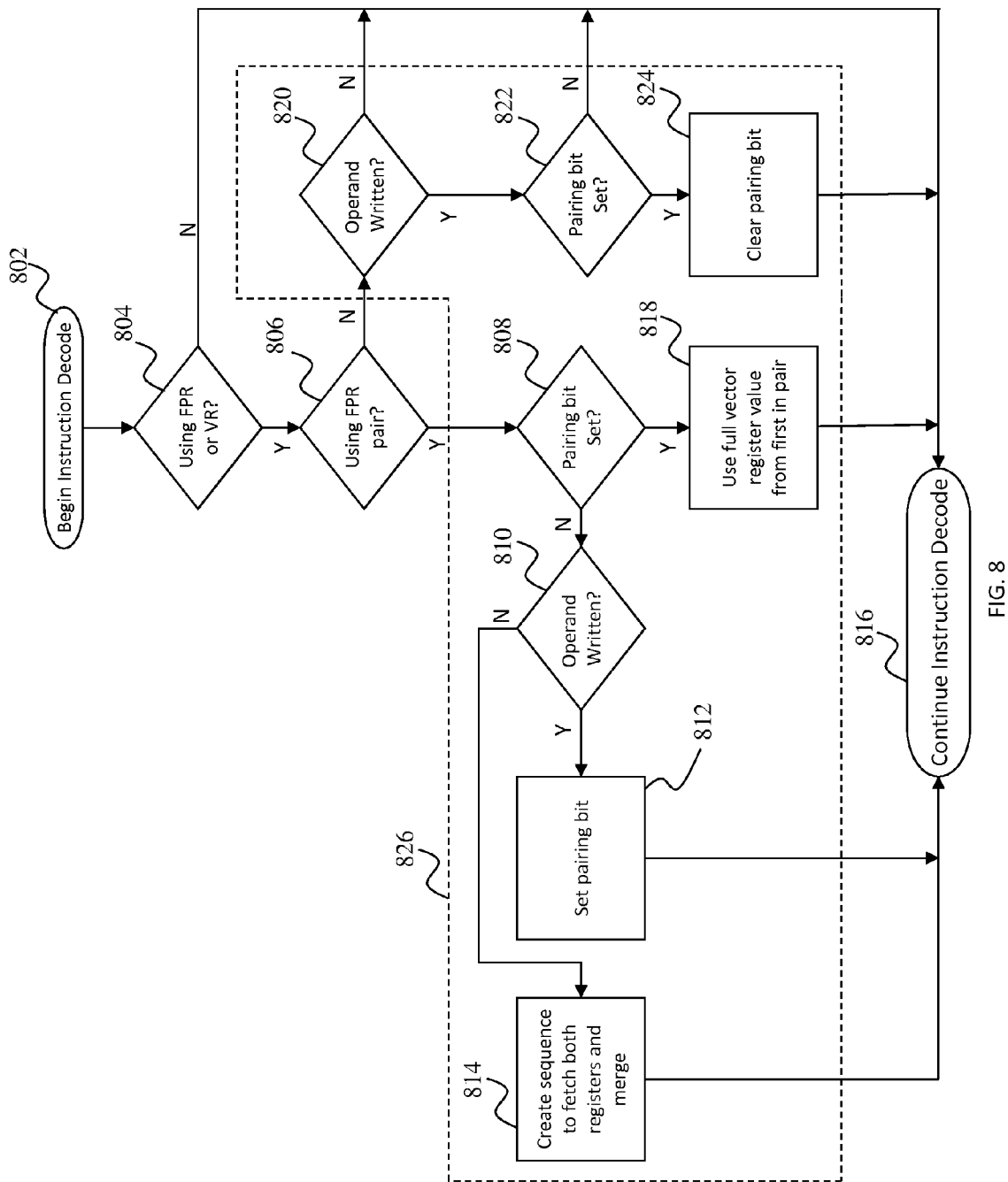
FIG. 8 depicts a process flow for maintaining register pairing status in an embodiment.

FIG. 8 depicts a process flow for maintaining register pairing status in an embodiment. In an embodiment, the process flow of FIG. 8 is executed by the fetch and dispatch unit 400 of FIG. 4. At block 802, the decoding of an instruction is started by, for example, the instruction decode/register rename module 404 of FIG. 4. At block 804, it is determined if the instruction includes operands that are in one of the FPRs, or the VRs. If the instruction includes operands that are in one of the FPRs or the VRs, then processing continues at block 806. At block 806, it is determined if the instruction uses an FPR pair. As stated above, certain extended precision floating point instructions use register pairs to store extended precision floating point numbers across two 64-bit registers that are paired together. If register pairs are used by the instruction, then processing of the blocks within the operand processing block 826 continues for each operand in the instruction starting at block 808.

At block 808, it is determined if a pair bit is set for each of the operands in the instruction. In an embodiment, the pairing bit is set in the register pair tracking module 406 of FIG. 4 as described above. If the operand does not have a pairing bit set, then processing continues at block 810 where it is determined if the operand is a write operand (i.e., the operand is where the result of the operation will be stored) or if the operand is to be read from the FPR. If the operand is a write operand that has been written, then processing continues at block 812, where a pairing bit is set for the operand's destination register pair (i.e., the register pair that will received the result of the instruction's operation). In an embodiment, once the instruction has completed successfully, the value of the result operation will be written across the high register's full 128 bits, and the low order bits will also be written to the low register of the register pair. In an embodiment, the low register may be the register that is numerically higher or lower than that of the high register in the register pair. Once the pairing bit is set, processing continues at block 816, where the instruction decode continues.

Returning to block 810, if the operand is not a write operand, then processing continues at block 814, where a sequence is created to fetch the two halves of the operand and merge them as described above with regard to FIG. 3A. Once the sequence is created, processing continues at block 816, where the instruction decode continues.

Returning to block 808, if the pairing bit is set for the operand, processing continues at block 818. At block 818, the operand value is selected in one operation from the full VR of the high register of the register pair as described above with regard to FIG. 3B above.

Returning to block 806, if the instruction is not using register pairing (i.e., the instruction is not an extended precision floating point operation) then processing continues at block 820. At block 820, it is determined if the operand is a write operand. If the operand is a write operand that will be written, then processing continues at block 822, where it is determined if a pairing bit was previously set for the register pair associated with the operand as described above. If the pairing bit has been set, then at block 824, the pairing bit is cleared for the register pair containing the write operand's single target register. The register bit is cleared because the target register that is either the low or high register of the register pair, has received a non-extended floating point value, and therefore the status of the register pair is no longer known to be valid.

Returning to block 822, if the pairing bit was not previously set for the target register pair, then processing continues at block 816, where the instruction decode continues.

Returning to block 820, if the operand is not a write operand, or no value was written to the target register associated with the operand, then processing continues at block 816, where the instruction decode continues.

Returning to block 804, if the instruction does not use values from the FPR or VR, then processing continues at block 816, where the instruction decode continues.

In an embodiment, register pair tracking is used in systems that perform speculative fetching and execution using branch prediction. In an embodiment, if a processor supports speculative execution a copy of the current pairing state is kept for each speculatively executed instruction so that if execution has to be rewound, such as when a branch misprediction occurs, a valid pairing state is restored instead of just clearing pairing state. In an additional embodiment, the pairing vector may be reset to all '0's, which will result in the loss of information about the known register pairing states.

Figure 9A:
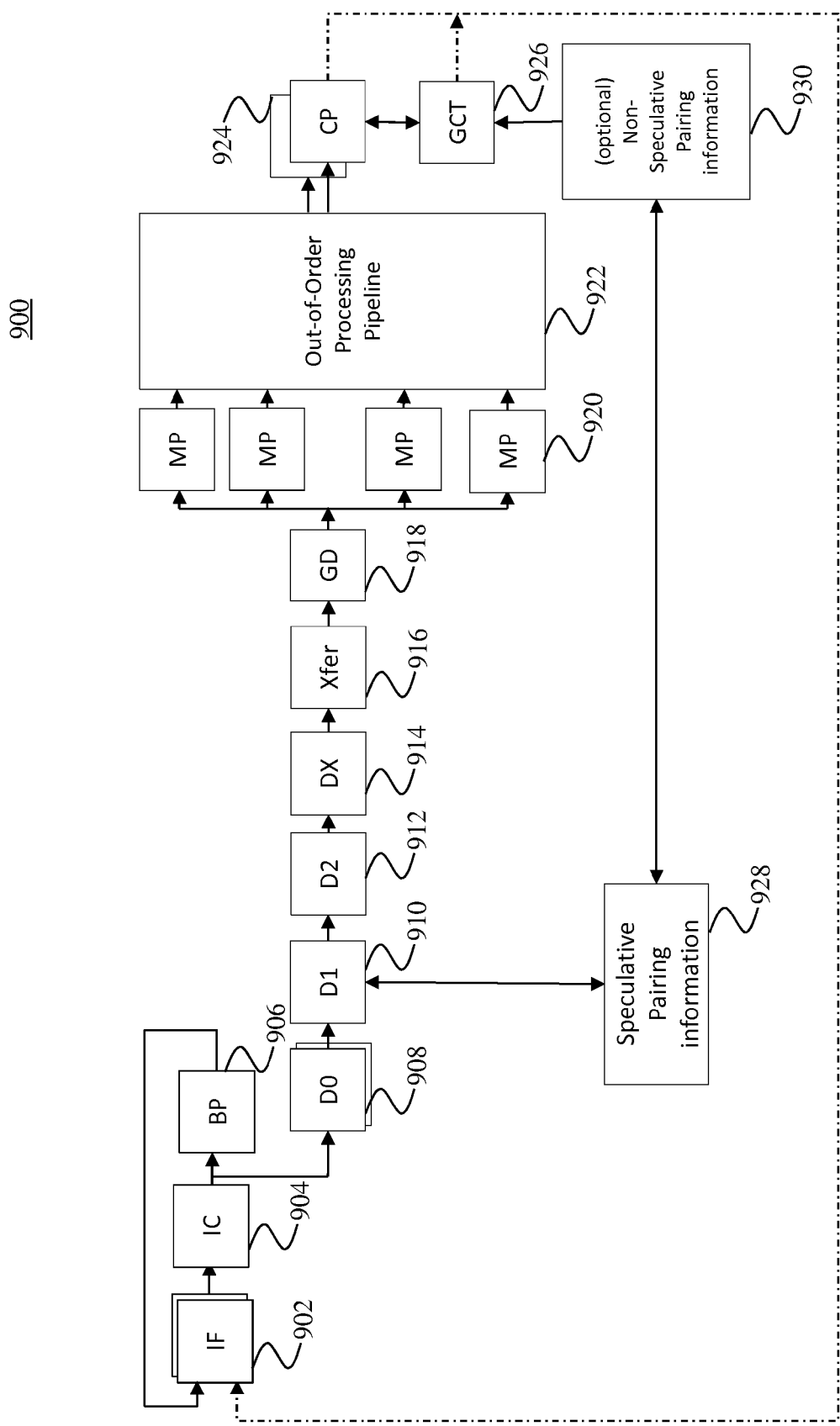
FIG. 9A depicts a system that performs speculative fetching based on branch predictions in an embodiment.

FIG. 9A depicts a system that performs speculative fetching based on branch predictions in an embodiment. In an embodiment, the system 900 includes an instruction fetch module 902 that is used to fetch instructions to execute. The fetched instructions are stored in the instruction cache 904 and are processed by the branch prediction module 906. The branch prediction module 906 uses branch prediction to predict branch execution and sends information to the instruction fetch module 902 to fetch additional instructions based on the prediction as is known in the art.

The instructions are retrieved from the instruction cache 904 by the first decode stage 908. The instruction progresses to the second decode stage 910. In an embodiment, the second decode stage 910 performs pairing based on the speculative predictions of the branch prediction module 906 and the instructions fetched by the instruction fetch module 902. In an embodiment, the second decode stage 910 uses the process flow described in FIG. 8 to set values and register pair settings based as it codes the instructions. In an embodiment, speculative pairing information 928 is sent to the global completion table (GCT) and is stored along with the other instruction information in order for any speculative register pairing information to be reverted in case a misprediction is discovered and the system is required to be rewound to a state that existed immediately before the misprediction occurred. In an embodiment, non-speculative pairing information 930 is sent along with the speculative pairing information 928 to the GCT. The non-speculative pairing information 930 is also used by the GCT to rewind the system back in case of a branch misprediction.

In an embodiment, the instruction passes through a third decode stage 912. In this decode stage the registers specified by the instruction are renamed to physical registers used by the out-of-order processing pipeline 922. If a register pair was found to be known in the second decode stage 910, only the one wide register needs to be renamed to a physical register instead of both registers in the pair.

In an embodiment, the instruction progresses through the remainder of the decode stages (e.g., decode stage D2 912, and decode stage DX 914) and processing of the decoded instruction is transferred 916 to the group dispatch module 918. The group dispatch module 918 then dispatches the decoded instruction to one of the one or more mapping modules 920 which then processing the instruction through the out-of-order processing pipeline 922 as is known in the art.

In an embodiment, the out-of-order processing pipeline processes instructions and sends the results to the group commit module 924, which ensures that all of the instructions in the group have executed successfully before they changes are full accessible to other processors. In an embodiment, the group commit module 924 and the GCT 926 transmit information to the instruction fetch module 902 that the instruction fetch module 902 uses to fetch instructions.

The system of FIG. 9A is provided for clarity. It will be understood that in other embodiment more or fewer components may be used as would be understood by one of ordinary skill in the art.

In an embodiment, register pair tracking is also used in multithreaded processors systems that perform speculative fetching using branch prediction. FIG. 9B depicts a multithreaded processor 990 that performs speculative fetching based on branch predictions in an embodiment. The branch prediction module 930 performs branch predictions for the processor and maintains a program counter for each of the threads using a T1 program counter 932 for thread 1, and a T0 program counter 934 for thread 0. An alternating component 936 is used to send instructions for each thread to the instruction cache 938. Each thread includes an instruction buffer. Instruction buffer 0 fetches instructions from the instruction cache 938 where speculative pairing information for thread 0 942 is generated and stored in the GCT 968 where it is stored and used to rewind the system as stated above.

Thread 1 also includes an instruction buffer 1 that fetches instructions from the instruction cache 938 and generates speculative pairing information for thread 1 946 which is stored in the GCT 968. The instructions are then prioritized using the thread priority component 948 and are dispatched according to priority by the group formation and instruction decode and dispatch module 950. Once the instructions are grouped they are dispatched to the shared register mapping and issues queues component 954. The instructions are picked up by the dynamic instruction selection module 956 and the various execution units 960, including FPUs and VFUs for each of the threads reads and writes data to the various register files 958 and 962 respectively. When the instructions are completed they are grouped by the grouping component module 964 and sent to the cache 966 when all of the instructions in the group are completed.

In an embodiment, the GCT may receive instruction level pairing information from the individual threads using a thread 0 instruction-level pairing component 970, and a thread 1 instruction level pairing component 972. The instruction level pairing information may be used to rewind the processor 990 in case of errors in the branch prediction.

The system of FIG. 9B is provided for clarity. It will be understood that in other embodiment more or fewer components may be used as would be understood by one of ordinary skill in the art. Furthermore, although only two threads were depicted in the processor of FIG. 9B, it will be understood that in other embodiments, pairing may be applied to processor that utilize any number of threads.

Figure 10:
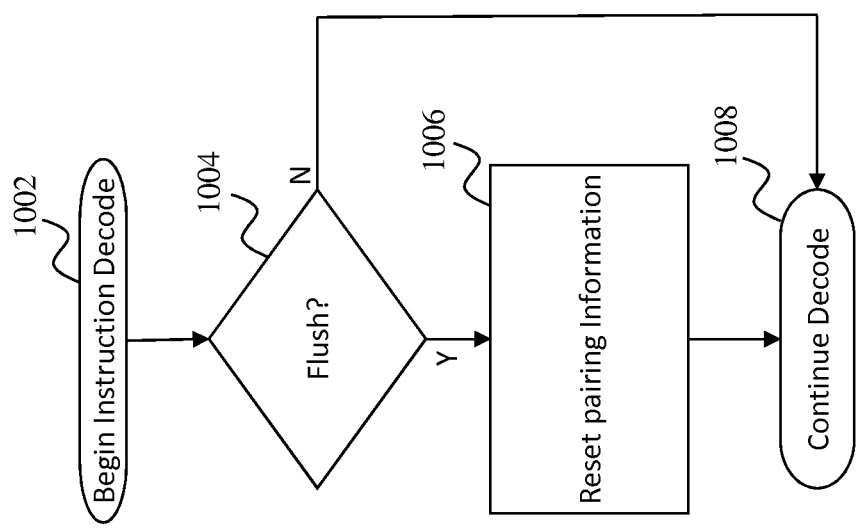
FIG. 10 depicts a process flow for maintaining register pairing status in a system that performs speculative execution in an embodiment.

FIG. 10 depicts a process flow for maintaining register pairing status in a system that performs speculative execution in an embodiment. In an embodiment, the process flow of FIG. 10 is used by the system of FIG. 9A and the processor of FIG. 9B. At block 1002 the decoding of an instruction is started. At block 1004, it is determined if a flush has occurred. In an embodiment, a flush must be performed if a misprediction or other issue in speculative execution is encountered while executing an instruction. If, for example, during instruction decode an indication that a previously predicted branch was predicted wrong, then a flush must be performed in order to flush the erroneously executed instructions in order to rewind the system to a state prior to the missed prediction. If a flush must be performed, then at block 1006 the pairing information is reset. In an embodiment, the pairing information is reset by retrieving the pairing information associated with the last good instruction that was stored as instruction level pairing information in the GCT. In an alternate embodiment, the pairing information is reset by zeroing out the pairing vector which erases any previously known pairings. At block 1008, the instruction decode is continued. Returning to block 1004, if no flush is required, then processing continues at block 1008 where the instruction decoding continues.

Operating systems executing on computer processors are often required to support multiple applications executing concurrently. When an operating system switches from processing a first application to a second application all of the settings, and register values associated with the first application are written to storage, and all of the values of the second application are loaded from storage and all of the settings, and register values of the second application are reset to the values they were before the second application's settings were stored. The processing of switching between applications is called context switching.

In an embodiment, the register state may also be affected by a function call by the operating system or an application. An operating system or application may call, for example, a library function. The function may perform a complex set of operations during which the vector registers (VR) are modified. Prior to modifying the VR, the function will copy the values of the VR, and after the function completes, the VR register is reloaded with the saved copy. In an embodiment, one or more of the register values may be overwritten by the function, therefore, the state of the registers may be different after the function is completed than they were prior to the function executing.

On a function call, context switch, or some other software or operating system event (collectively referred to as a software indication) some or all of the vector registers are saved to memory and then reloaded destroying the register pairing state that was previously stored in the hardware. Without the recovery of the pairing information, all pairing would have to be recreated again over time.

In an embodiment, when the register state is saved the register pairing state is also saved. The register pairing state is then restored when the register state is reloaded from memory. As stated above, some function calls might only restore a portion of the register state. In an embodiment, the restoration of the register pairing state may occur under the control of a mask. Using the mask, only the pairing information for certain unmasked registers is restored.

Figure 11B:
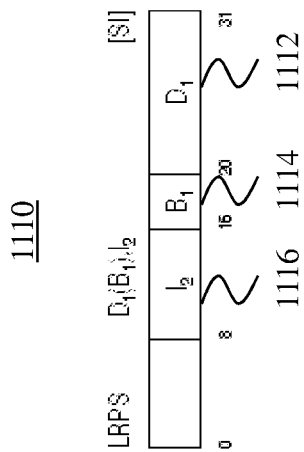
FIG. 11B depicts an instruction for loading register pair state instruction in an embodiment.
Figure 11A:
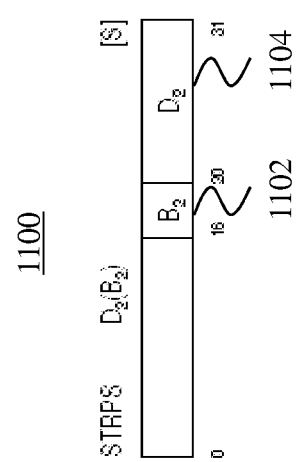
FIG. 11A depicts an instruction for storing register pair state instruction in an embodiment.

FIG. 11A depicts an instruction for storing register pair state instruction in an embodiment. In an embodiment, a store vector pairing state instruction 1100 (STRPS) stores the pairing state to a memory address specified by adding an offset value 1104 to a general purpose register address 1102.

FIG. 11B depicts an instruction for loading register pair state instruction in an embodiment. In an embodiment, a load vector pairing state instruction 1110 (LRPS) loads the pairing state from a memory address specified by adding an offset value 1112 to a general purpose register address 1114. The LRPS 1110 loads the pairing state from memory at a specified memory address 1112 into a temporary area. The LRPS specifies a mask address 1114 for mask that is stored in either a register, an immediate field, or a memory location. In an embodiment, each bit of the mask represents whether the pairing state being loaded from memory is valid.

Figure 12:
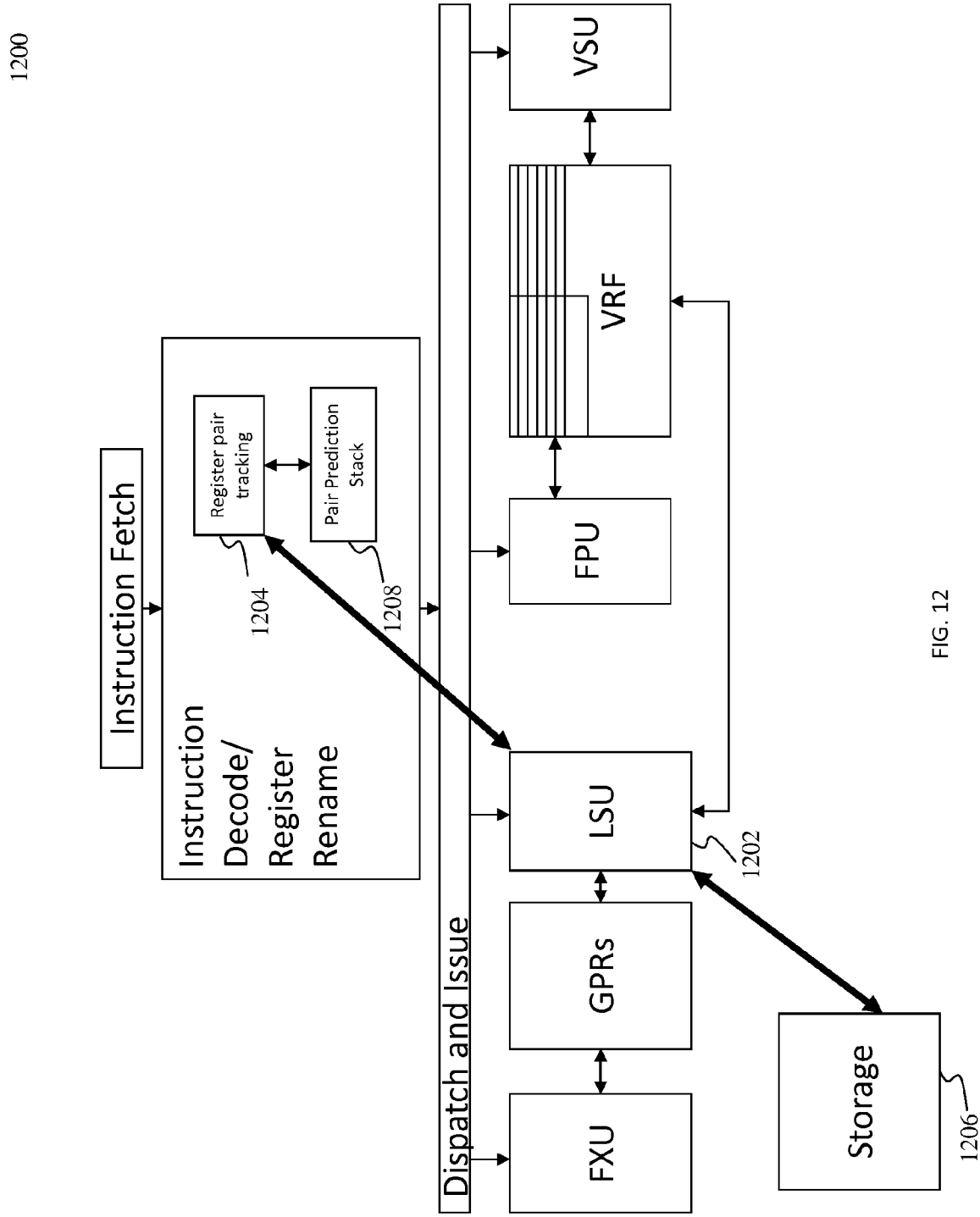
FIG. 12 depicts the fetch and dispatch unit of a computer processor the implements instructions for loading and storing register pairing states in an embodiment.

FIG. 12 depicts the fetch and dispatch unit of a computer processor that implements instructions for loading and storing register pairing states in an embodiment. In an embodiment, the fetch and dispatch unit 1200 of FIG. 12 is the fetch and dispatch unit 400 of FIG. 4. In an embodiment, when the STRPS instruction 1100 is executed, the load store unit 1202 (LSU) fetches the pairing vector from the register pair tracking module 1204 and stores it in a storage location 1206. In an embodiment, the storage location 1206 is an area in main memory. In an additional embodiment, the storage location 1206 is on a storage disk such as a hard drive or a storage area network (SAN).

In an embodiment, when the LRPS instruction 1110 is executed, the load store unit 1202 (LSU) fetches the pairing vector from the storage location 1206 loads it into a temporary location such as an internal register, and applies the mask as described above. The resultant pairing vector is loaded from the temporary location into the register pair tracking module 1204.

In a speculative out of order microprocessor, such as the processor of FIG. 9B, the decoding of instructions which access the vector register file has to be stalled until the pairing state is restored from the storage location.

Figure 13:
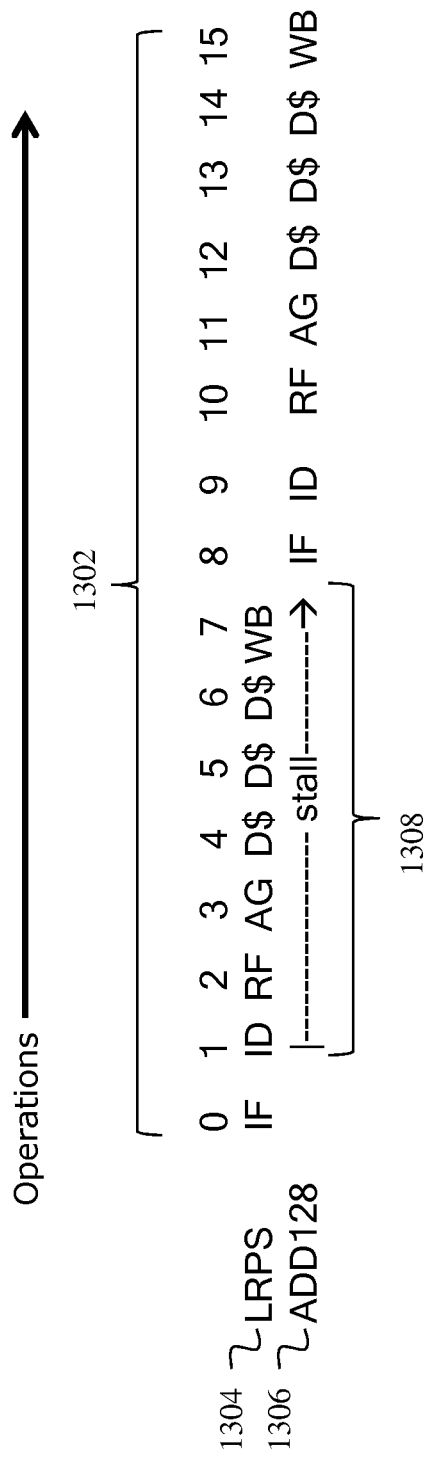
FIG. 13 depicts an load vector pairing state instruction (LRPS) instruction and an extended precision operation executing on a speculative out of order processor in an embodiment.

FIG. 13 depicts an LRPS instruction and an extended precision operation executing on a speculative out of order processor in an embodiment. When the context is switched or a function is executed an LRPS instruction 1304 is attempted to be executed concurrently with an extended precision operation 1306. The instructions are executed over a number of operations 1302. In an embodiment the LRPS instruction 1304 is fetched from memory by the instruction fetch (IF) unit. Instruction fetch is followed by the instruction decode (ID). The decode is followed by a number of data cache accesses and finally a write back is processed to write the register pairing information back to the register pair tracking module 1204 of FIG. 12. In an embodiment, the LRPS instruction 1304 takes 7 operations to complete, however, in order for the extended precision operation 1306 to take advantage of the enhanced register pairing functionality, the extended precision operation 1306 will stall 1308 while waiting for the LRPS instruction 1304 to complete.

In an embodiment, a pair predication stack 1208 of FIG. 12 is used to store pair prediction information as context switches are performed or functions are executed. In an embodiment, the pair prediction stack 1208 is implemented as a first in first out (FIFO) stack. When the pair information is saved to a storage location as described above, a copy of the information is also stored in the pair prediction stack 1208. When the pairing information is restored from the storage location the latest entry is removed from the pair prediction stack 1208. The pair prediction stack 1208 may be used to predict what the values in the register pair tracking module 1204 will be and prevent a stall as described above.

Figure 14:
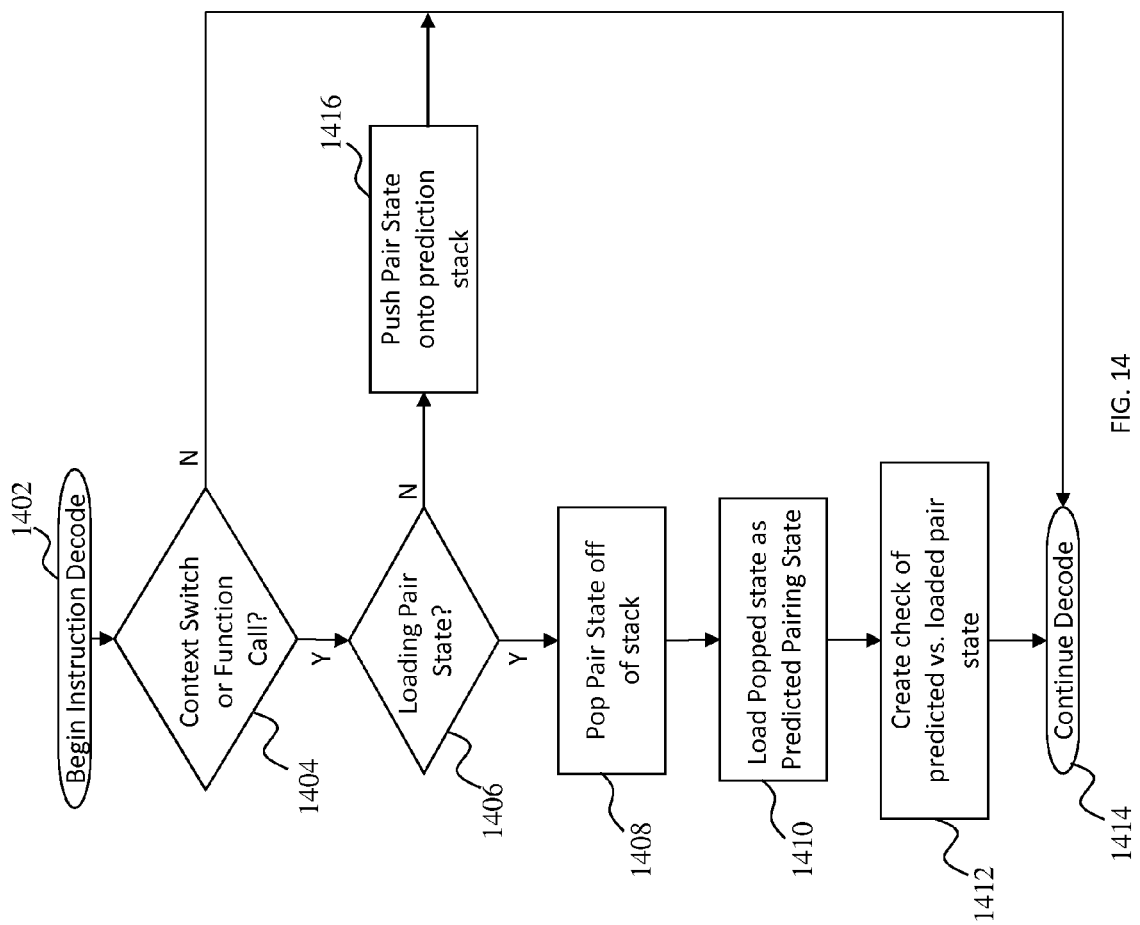
FIG. 14 depicts a process flow for performing pair prediction in an embodiment.

FIG. 14 depicts a process flow for performing pair prediction in an embodiment. At block 1402 the decoding of an instruction is started. At block 1404, it is determined if a context switch or function call is occurring which will cause the pair state to be loaded or saved. As stated above, pairing state is saved before a context switch or function starts and is loaded after a context switch or function is completed. If either a context switch or function call is occurring, then at block 1406 it is determined if the pairing state is being loaded. If the pairing state is loading then processing continues at block 1408. At block 1408, the latest set of pairing information is removed, or popped, from the pair prediction stack 1208 of FIG. 12. At block 1410, the popped pairing state is loaded into the register pair tracking module 1204 of FIG. 12 as the predicted pairing information. In an embodiment, once the predicted pairing information is loaded into the register pair tracking module 1204, any subsequent instruction may be executed without stalling.

At block 1412, the register pairing information is loaded from storage as described above, and the actual register pairing information is compared to the predicted register pairing information loaded at block 1410. If the two values match, then processing continues at block 1414 where the instruction decoding continues, otherwise, the pairing state is reset as described above with regard to the process flow of FIG. 10.

Returning to block 1406, if the pairing state is not loading (i.e., it is being stored) then at block 1416 the register pairing state is pushed onto the pair prediction stack 1208. Processing then continues at block 1414 where the instruction decoding continues. Returning to block 1404, if there is no context switch or function call, then processing continues at block 1414 where the instruction decoding continues.

Figure 15:
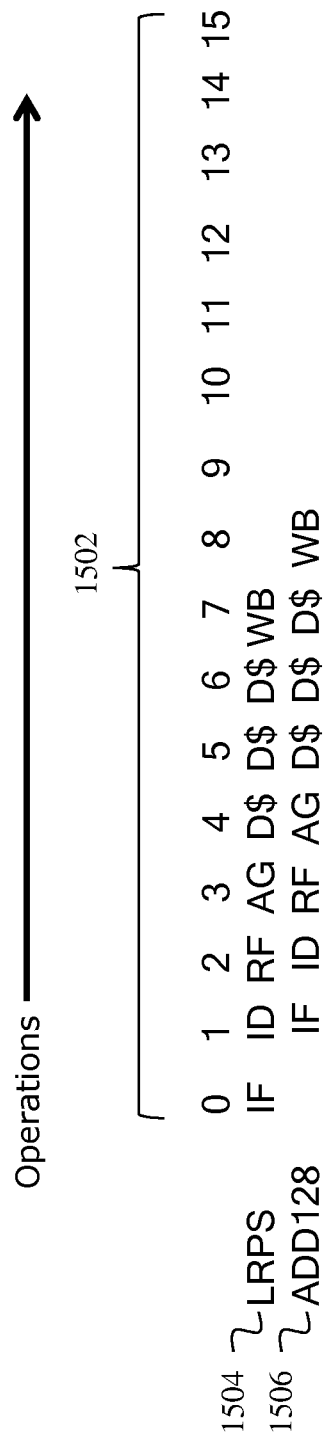
FIG. 15 depicts an LRPS instruction and an extended precision operation executing on a speculative out of order processor using pair prediction in an embodiment.

FIG. 15 depicts an LRPS instruction and an extended precision operation executing on a speculative out of order processor using pair prediction in an embodiment. The instructions are executed over a number of operations 1502. In an embodiment the LRPS instruction 1504 performs an instruction fetch (IF) is followed by an instruction decode (ID). The decode is followed by a number of data cache accesses and finally a write back is processed to write the register pairing information back to the register pair tracking module 1204 of FIG. 12. In an embodiment, the LRPS instruction 1504 takes 7 operations to complete as stated above with regard to FIG. 13, however, because pair prediction is used, as soon as the LRPS instruction 1504 begins the ID the register pairing information saved in the pair prediction stack 1208 of FIG. 12 is loaded into the register pair tracking module 1204 as described above with regard to FIG. 14, and the extended precision instruction 1506 continues instruction decode without stalling. Both instructions are executed over 8 operation cycles as opposed to the required 15 without pair prediction.

Modern speculatively executing superscalar processors provide a way to rewind if they speculatively go down the wrong path. In an embodiment, whenever an instruction that reads a pair of registers is decoded by the processor, the processor may speculatively predict that the wide register will contain the data from the register pair. However, it then has to insert an instruction to check that the data in the right half of the wide register matches the data in the second register of the pair. If the comparison fails, the processor will rewind and re-decode the instruction that needs a pair of registers. It will then have to reissue a sequence of operations to read the two registers in the pair and merge them into a single operand before executing the original operation. In an embodiment, a learning algorithm is employed so that if the pairing state is known the check will be skipped. In addition, if it is known that data is not in the wide register a merge will always be required without the need to perform a check.

In an embodiment, for each set of paired registers the instruction decode/register rename module 404 of FIG. 4 maintains three states. The three states are that the register pair is stored across the wide register, that the register pair is not stored across the wide register, or that it is unknown if the register pair is stored across the wide register. When the state is known the instruction decode/register rename module 404 will either retrieve the data from the wide register (if it is there), or it will insert an operation to fetch both of the registers and merge the data (if the data is not stored in the wide register).

In an embodiment, when the state of the pair of registers is unknown, the instruction decode/register rename module 404 will speculatively execute the operation with the full wide vector. It then must insert a check operation to ensure that the data for the register pair is contained in the wide register. If the check passes then the state of the pair is set to known paired and stored in the wide register and execution continues. If the check fails, execution is rewound to the point before the operation that used the register pair, and the state of the pair is set to not paired. The instruction decode/register rename module 404 then generates a merge sequence to read the pair of registers.

Figure 16:
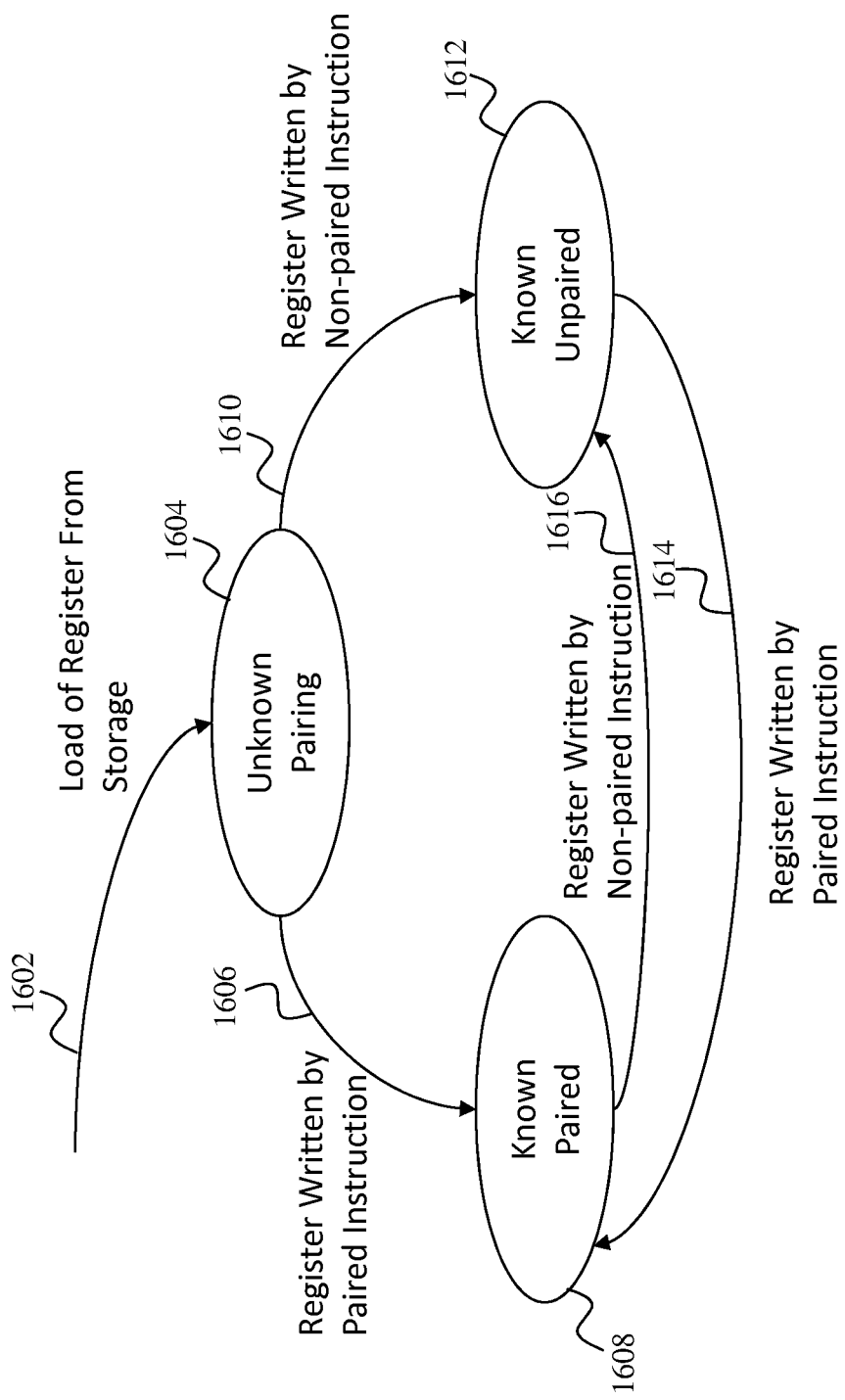
FIG. 16 depicts a state diagram for determining the state of a register pair in an embodiment.

FIG. 16 depicts a state diagram for determining the state of a register pair in an embodiment. In an embodiment, the registers are loaded from storage 1602 after, for example, a context switch or a function call or normal execution. When the registers are first loaded from storage, their pairing state is unknown 1604. From the unknown state 1604, if a register is written using an extended precision instruction (i.e., an instruction known to pair the registers) the state transitions 1606 to a known paired state 1608. If, however, either of the registers of a register pair is written by a non-extended precision instruction, then a non-paired transition 1610 occurs and the state of the register pairing becomes a known unpaired state 1612.

From the known unpaired state 1612 a known paired transition 1614 occurs when the register pair is written to by an extended precision instruction, and the state transitions to the known paired state 1608. From the known paired state 1608, a known un-paired state transition 1616 occurs if either of the registers of a register pair is written by a non-extended precision instruction, and the state of the register pairs becomes the known unpaired state 1612.

Figure 17:
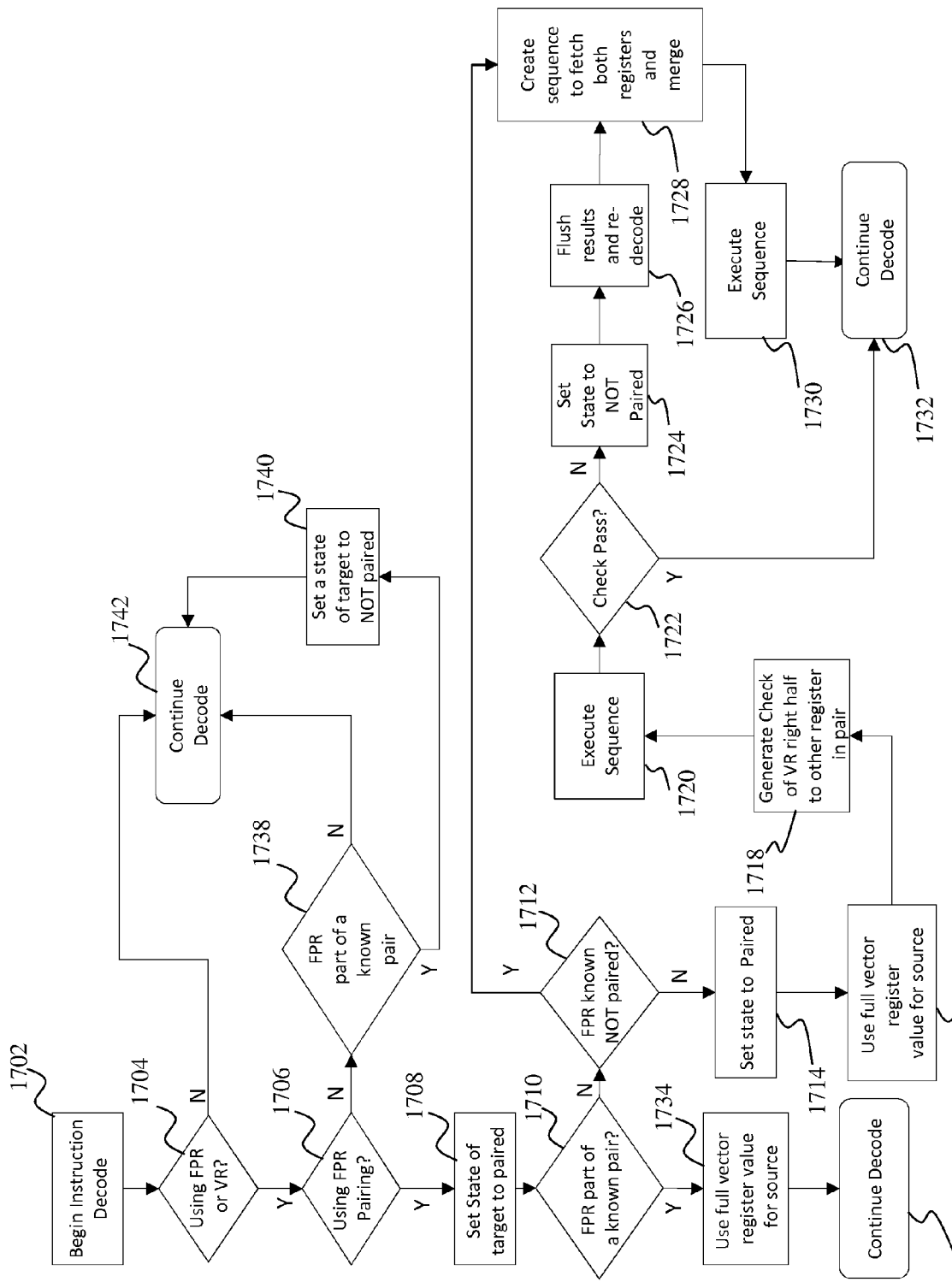
FIG. 17 depicts a process flow for managing an unknown pairing state in an embodiment.

FIG. 17 depicts a process flow for managing an unknown pairing state in an embodiment. In an embodiment, the process flow of FIG. 5 is executed by the fetch and dispatch unit 400 of FIG. 4. At block 1702, the instruction decode process begins. At block 1704, it is determined if the instruction includes operands that are in one of the FPRs, or the VRs. If the instruction includes operands that are in one of the FPRs or the VRs, then processing continues at block 1706. At block 1706, it is determined if the instruction uses FPR pairing (i.e., is the instruction an extended precision instruction). As stated above, certain extended precision floating point instructions use register pairs to store extended precision floating point numbers across two 64-bit registers that are paired together. If register pairing is used by the instruction, then at block 1708, the state of the register pairing for the target register of the instruction (i.e., where the result of the instruction is stored) is set to paired. In an embodiment, the state is set in the register pair tracking module 406. At block 1710 it is determined if the FPR of the input operands (i.e., the operands that will be used to generate the result of the extended precision operation) are part of a known pair. A known pair is any register pair where the status is known to be paired. If the pairing status of the registers is not known, then processing continues at block 1712.

At block 1712, it is determined if the register pair is known to be not paired. If the register pair is not known to be not paired (i.e., the status of the register pairing is unknown), then processing continues at block 1714 where the state of the register pair is set to paired as described above. At block 1716, the full VR value is used for the source operand (i.e., the full 128-bit value is selected from the high register of the register pair without performing a merge.) At block 1718, a check is generated to ensure that the low order bits of the selected register match the low register part of the extended precision floating point number. At block 1720, the check is performed by executing the generated check sequence of instructions. At block 1722, it is determined if the check has passed (i.e., the bits match). If the check did not pass, at block 1724, the register pair is set as not paired in the register pair tracking module 406. At block 1726, the results of the instruction decode are flushed, and the instruction is redecoded from the beginning (block 1702). At block 1728, a sequence is created to fetch the register values from both of the register pairs, and to merge the values to create an extended precision floating point number. At block 1730, the sequence to fetch and merge the registers is performed. At block 1732, decode of the instruction continues.

Returning to block 1722, if the check of the low order bits of the VR against the bits stored in the low register of the register pair succeeds, then at block 1732 decode of the instruction.

Returning to block 1712, if the register pair is known to be not paired, then at block 1728, a sequence is created to fetch the register values from both of the register pairs, and to merge the values to create an extended precision floating point number. At block 1730, the sequence to fetch and merge the registers is performed. At block 1732, decode of the instruction continues.

Returning to block 1710, if the pairing status of the registers is known to be paired, then processing continues at block 1734 where the full 128-bit VR value is used without requiring a merge. At block 1736, the decode of the instruction continues.

Returning to block 1706, if the instruction does not uses FPR pairing (i.e., the instruction is not an extended precision floating point instruction) then at block 1738 it is determined if the target FPR is part of a known register pair (i.e., it was previously known to be part of a register pair.) If the FPR was part of a known register pair, then at block 1740, the state of the register pairing for the target register of the instruction is set to not paired. At block 1740, the decode of the instruction continues.

Returning to block 1738, if the target FPR is not part of a known pair, then at block 1742, the decode of the instruction continues. Returning to block 1704, if the instruction does not use an FPR or a VR then at block 1742, the decode of the instruction continues.

FIG. 18A depicts sample extended precision operations on a paired register without the use of register paired states in an embodiment. A first instruction 1804 is executed. The instructions are executed over a number of operations 1802. The first instruction 1804 includes two 128-bit operands that are stored in a paired register configuration and executes over a series of operations. In an embodiment, the first instruction 1804 executes two register file fetches (RF) to selected the two 128-bit operands from the register pairs (i.e., one half of in each floating point number in each of two registers) followed by a merge operation (M). The merge operation merges the two halves of each of the 128-bit operands into single operands. The instructions operation (e.g., addition) is carried out over three execution operations (EX), a condition code (CC) is set, and then the two halves of the result are written to the two register pairs over two write back operations (WB). The second instruction 1806 is executed in the same manner. The result requires 16 operations over 12 cycles.

FIG. 18B depicts sample extended precision operations on a paired register using predictive register pairing in an embodiment. In an embodiment, the register pairing status of the operands of the extended precision operations is unknown prior to the execution of the instructions. FIG. 18B includes the executed instructions 1814, as well as the decoded instructions 1816 that the decode operation described above with regard to FIG. 17 produces. In an embodiment, the instruction decode/register rename module 404 of FIG. 4 receives an ADD128 instruction 1818 and predicts successful pairing. The instruction decode/register rename module 404 generates an iADD128p instruction which retrieves the register information as a full 128-bit value from the VR, and generates an iCHK instruction 1820, which checks the low order bits of the 128-bit VR value against the low register value to determine if they are equal. In an embodiment, the instruction decode/register rename module 404 may generate a pair of iADD128p and iCHK instructions for each operand in the instruction for which the pairing state is unknown. The iCHK instruction 1820 performs an RF and then the compare is performed by the EX operation. As stated above, the pair state of the operand register is speculatively set to paired and is updated to unpaired if the check fails.

In an embodiment, if the iCHK operation succeeds, then no message returns. However, if an error occurs then the error is processed as described above with regard to FIG. 17.

In the embodiment depicted in FIG. 18B, the iCHK operation completes successfully. The second ADD128 instruction 1822 shares the same operands as the first ADD128 instruction, and because the register pairing state of the operands was determined as paired, the second ADD128 instruction 1822 will execute only an iADD128p instruction, and no additional check operation (iCHK) is required. The execution of the extended precision instructions of FIG. 18B therefore executed only 15 operations over 9 cycles to reach the same result as the instructions of FIG. 18A, and because the register pairing state of the operands is now known, future extended operations that use those register pairs will execute even more efficiently.

Figure 19:
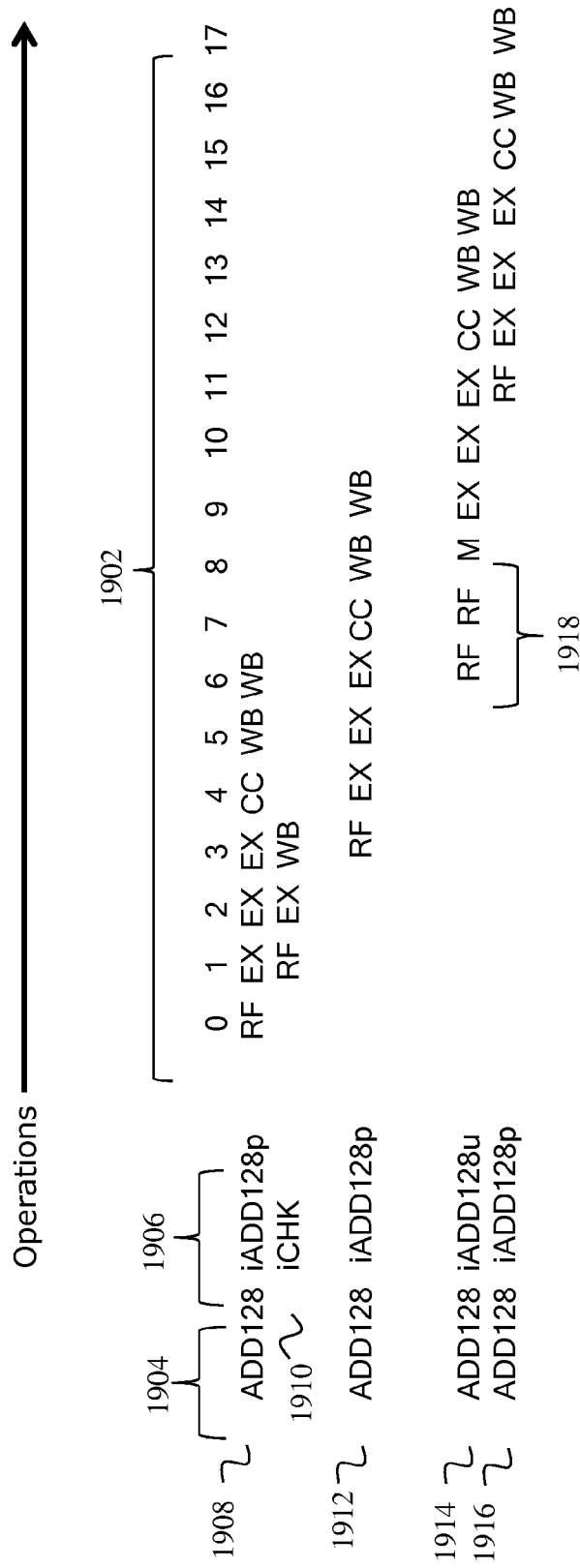
FIG. 19 depicts sample extended precision operations on a paired register using unsuccessful predictive register pairing in an embodiment.

FIG. 19 depicts sample extended precision operations on a paired register using unsuccessful predictive register pairing in an embodiment. In an embodiment, the register pairing status of the operands of the extended precision operations is unknown prior to the execution of the instructions. FIG. 19 includes the decoded instructions 1904, as well as the internally executed instructions 1906 that the decode operation described above with regard to FIG. 17 produces. In an embodiment, the instruction decode/register rename module 404 of FIG. 4 receives an ADD128 instruction 1908 and predicts successful pairing. The instruction decode/register rename module 404 generates an iADD128p instruction which retrieves the register information as a full 128-bit value from the VR, and generates an iCHK instruction 1910, which checks the low order bits of the 128-bit VR value against the low register value to determine if they are equal. The iCHK instruction 1910 performs an RF and then the compare is performed by the EX operation. As stated above, the pair state of the operand register is speculatively set to paired and is updated to unpaired if the check fails. In this case, the iCHK fails because the low order bits in the VR do not match the bits in the low register, and a writeback (WB) is performed to indicate the prediction is incorrect. The WB triggers an unpairing of the register pair (i.e., the register pair tracking module is updated to indicate that the register is not part of a register pair) and a flush of the result of the first ADD128 instruction 1908. The second ADD128 instruction 1912, was initiated while the check was occurring, and because the second ADD128 instruction 1912 used the same pair registers as the first ADD128 instruction 1908, the instruction is also rolled back.

The first instruction is started again as a third instruction ADD128 1914. Because the register pairing status is now known to be unpaired as a result of the rollback, the instruction decode/register rename module 404 generates an iADD128u instruction. The iADD128u instruction indicates that the operand register pairs are in an unpaired state, therefore the instruction will perform 2 fetches and a merge operation 1918 before performing the target operation. The fourth ADD128 instruction 1916 uses the target register of the third ADD128 instruction 1914, which is now a known pairing, and therefore the instruction decode/register rename module 404 generates an iADD128p instruction which uses a single RF without a merge to fetch the 128-bit value from the VR.

In an embodiment, all inputs are either considered paired, or unpaired, and two instruction operations are implemented for each operation, a paired and an unpaired version, e.g., iADD128p and iADD128u.

In an additional embodiment, each operand is considered separately, and internal instruction operations iADD128pp, iADD128pu, iADD128up, and iADD128uu exist, reflecting (1) a first and second operand being paired, (2) a first operand being paired, but not a second operand, (3) a second operand being paired, but not a first operand, (4) a first and second operand being not paired, respectively.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Referring now to FIG. 20, in one example, a computer program product 2000 includes, for instance, one or more storage media 2002, wherein the media may be tangible and/or non-transitory, to store computer readable program code means or logic 2004 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

An embodiment includes a system for reducing a number of read ports for register pairs. The system includes a set of registers and a set of wide registers. The set of registers and the set of wide registers are addressable by register fields of instructions. The system additionally includes a processing circuit coupled to the set of registers and the set of wide registers and is configured to perform a method that includes executing an instruction. The instruction identifies a pair of registers as containing a wide operand which spans the pair of registers. It is determined if a pairing indicator associated with the pair of registers has a first value or a second value. The first value indicates that the wide operand is stored in a wide register, and the second value indicates that the wide operand is not stored in the wide register. Based on the pairing indicator having the first value, the wide operand is read from the wide register. Based on the pairing indicator having the second value, the wide operand is read from the pair of registers. An operation is performed using the wide operand.

An additional embodiment includes a dataflow of execution units of the processor which is as wide as the wide operand.

A further embodiment includes only needing one register file read port to read the wide operand when the pairing indicator has the first value while requiring an additional read port or multiple accesses to read when the pairing indicator has the second value.

An additional embodiment includes setting the pairing indicator to the first value based on an instruction writing a wide operand across the pair of registers, and the wide operand is further stored in the wide register.

A further embodiment includes setting the pairing indicator to the second value based on an instruction writing an operand to only one register of the pair of registers.

An additional embodiment includes one register of the pair of registers is inside wide register includes.

A further embodiment includes reading a wide operand by accessing only the wide operand register.

An additional embodiment includes speculatively updating the pairing indicator wherein. The updating includes at least one of: setting the pairing indicator to the first value based on an instruction storing a wide operand across paired registers; setting the pairing indicator to the second value based on an instruction storing an operand to only one of said paired registers; and undoing a speculative state update based on an indication of misprediction. The undoing of the speculative state update includes at least one of: setting the pairing indicator to indicate that no pairings are present; and retrieving the pairing indicator from a pairing rename register, the retrieved pairing indicator corresponding to a point prior to the point of the misprediction.

Technical effects and benefits include reducing the number of register read ports for retrieving data from a register pair by storing a copy of the data in a single wide register. An additional benefit includes backward compatibility with existing pairing implementations by maintaining the register pairs and allowing access to each register pairs of the register pairs. A further benefit includes reducing the number of operations required to access data in a register pair. An additional benefit includes providing speculative pairing for single and multi-threaded computer processors. A further benefit includes providing instructions for storing and loading pairing information to support context changes and the use of functions. Yet another benefit includes predicting pairing state by maintaining a three state classification of pairing state including a known paired state, a known unpaired state, and an unknown pairing state.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for reducing a number of read ports for register pairs, the system comprising:
   a set of registers, and a set of wide registers, the set of registers and the set of wide registers being addressable by register fields of instructions; and
   a processing circuit coupled to said set of registers and said set of wide registers, the processing circuit configured to perform a method comprising:
   executing an instruction, the instruction identifying a pair of registers as containing a wide operand, the wide operand spanning the pair of registers, the executing comprising:
   determining whether a value stored in a wide register corresponds to a value stored across the pair of registers;
   based on determining that the value stored in the wide register corresponds to the value stored across the pair of registers, reading the wide operand from the wide register;
   based on determining that the value stored in the wide register does not correspond to the value stored across the pair of registers, reading the wide operand from the pair of registers; and
   performing an operation using the wide operand;
   wherein only a single register read port and a single operation is required to read the wide operand when it is read from the wide register, and multiple register read ports or multiple operations are required to read the wide operand when it is read from the pair of registers.

2. The system of claim 1, wherein dataflow of execution units of the processor is as wide as the wide operand.

3. The system of claim 1, wherein the determining comprises determining whether a pairing indicator corresponding to the pair of registers has a first value or a second value, the first value indicating that the wide operand is stored in the wide register and the second value indicating that the wide operand is not stored in the wide register.

4. The system of claim 3, wherein the pairing indicator is set to the first value based on an instruction writing a wide operand across the pair of registers, wherein the wide operand is further stored in the wide register.

5. The system of claim 1, wherein the pairing indicator is set to the second value based on an instruction writing an operand to only one register of the pair of registers.

6. The system of claim 1, wherein the wide register includes one register of the pair of registers.

7. The system of claim 1, further comprising when reading a wide operand only the wide operand register needs to be obtained.

8. The system of claim 1, further including speculatively updating the pairing indicator wherein the updating comprises at least one of:
   setting the pairing indicator to the first value based on an instruction storing a wide operand across paired registers;
   setting the pairing indicator to the second value based on an instruction storing an operand to only one of said paired registers; and
   undoing a speculative state update based on an indication of misprediction, the undoing comprising at least one of:
   setting the pairing indicator to indicate that no pairings are present; and
   retrieving the pairing indicator from a pairing rename register, the retrieved pairing indicator corresponding to a point prior to the point of the misprediction.

* * * * *